United States Patent [19]
Farrand et al.

[11] Patent Number: 5,309,563
[45] Date of Patent: May 3, 1994

[54] COMPUTER IMPLEMENTED METHOD FOR TRANSFERRING COMMAND MESSAGES BETWEEN A SYSTEM MANAGER FOR A COMPUTER SYSTEM AND A NETWORK OPERATING SYSTEM ASSOCIATED THEREWITH

[75] Inventors: Scott C. Farrand, Tomball; Thomas J. Hernandez, Houston; James E. Barron; Ronald A. Neyland, both of Spring; Cheryl X. Chen, Tomball; Gaines C. Teague; Paul J. Muraski, both of Spring; Jay C. Brinkmeyer, Tomball, all of Tex.

[73] Assignee: Compaq Computer Corporation, Houston, Tex.

[21] Appl. No.: 756,488

[22] Filed: Sep. 9, 1991

[51] Int. Cl.[5] ...................... G06F 13/00; G06F 15/16
[52] U.S. Cl. .................................... 395/200; 395/325; 395/750; 364/284; 364/284.3; 364/284.4; 364/940.61
[58] Field of Search ............... 395/650, 325, 725, 200

[56] References Cited
U.S. PATENT DOCUMENTS

| 4,380,798 | 4/1983 | Shannon et al. | 364/DIG. 1 |
| 4,594,657 | 6/1986 | Byrns | 364/DIG. 1 |
| 4,636,942 | 1/1987 | Chen et al. | 364/DIG. 1 |
| 4,754,398 | 6/1988 | Pribnow | 364/DIG. 1 |
| 5,159,673 | 10/1992 | Sackmann et al. | 395/325 |

Primary Examiner—Eddie P. Chan
Attorney, Agent, or Firm—Konneker Bush Hitt & Chwang

[57] ABSTRACT

A protocol for local data transfers between a system manager for a computer system and a network operating system associated with the computer system and a method for exchanging command and response messages between the system manager and the network operating system using a bus master interface provided between the two. Various ones of the interface registers are reserved by the side transferring information, command written to the interface registers and the other side notified of the information transferred to the interface and the reservation released. The interface is also used to transfer responses to the side originating the command.

12 Claims, 7 Drawing Sheets

COMPUTER IMPLEMENTED METHOD FOR TRANSFERRING COMMAND MESSAGES BETWEEN A SYSTEM MANAGER FOR A COMPUTER SYSTEM AND A NETWORK OPERATING SYSTEM ASSOCIATED THEREWITH

CROSS REFERENCE TO RELATED APPLICATIONS

This application is related to co-pending U.S. patent application Ser. Nos. 07/720,259 entitled COMPUTER SYSTEM MANAGER, 07/719,240 entitled INNATE BUS MONITORING SYSTEM FOR COMPUTER SYSTEM MANAGER, 07/720,258 entitled IN-BAND/OUT-OF-BAND ALERT DELIVERY SYSTEM, 07/719,243 entitled REMOTE CONSOLE EMULATOR FOR COMPUTER SYSTEM MANAGER, and 07/719,394 now U.S. Pat. No. 5,283,905 entitled POWER SUPPLY FOR COMPUTER SYSTEM MANAGER, all of which were filed on Jun. 24, 1991, assigned to the assignee of the present invention and hereby incorporated by reference as if reproduced in their entirety.

This application is further related to co-pending U.S. patent application Ser. Nos. 07/756,506 entitled REMOTE SYSTEM REBOOT, 07/757,066 now U.S. Pat. No. 5,272,382 entitled POWER SUPPLY FOR COMPUTER SYSTEM MANAGER and to U.S. Pat. No. 5,257,384 entitled ASYNCHRONOUS PROTOCOL FOR COMPUTER SYSTEM MANAGER, all of which were filed on Sep. 9, 1961, assigned to the assignee of the present invention and hereby incorporated by reference as if reproduced in their entirety.

BACKGROUND OF THE INVENTION

1. Field of the Invention

The invention relates to a system manager for a computer system, and, more particularly, to a protocol for local data transfers between a system manager and a network operating system associated with the computer system.

2. Description of Related Art

The desire to share computer resources has motivated the development and continuing improvement of computer networks. One such computer network is generally referred to as a local area network (or "LAN"). A LAN is a system of computer printers and other peripherals into a network suitable for transmission between various ones of the linked components located in relative proximity to each other, for example in different offices in a building, or in different buildings situated near one another. Similar to a LAN is a wide area network (or "WAN"). A WAN differs from a LAN in that a telephone network is also required to link at least some of the components included in the network to the remainder of the network components.

Various types of network operating systems are in existence today. They include the NetWare system manufactured by Novell, Inc. of Provo, Utah, the VINES system manufactured by Banyan, and the LAN Manager system manufactured by Microsoft Corporation of Redmond, Wash. While such network operating systems often include a network manager, the network manager included in such systems have typically relies upon the network operating system to provide data to the network manager for performing network management functions. Since network managers have been forced to rely upon data transmitted by the network, prior network managers have focussed on analyzing the health of the network and have not been particularly well suited to analyze the health of the components of the network.

Thus, of the five functional areas of network management (configuration, fault analysis, accounting, performance and security) recognized by the OSI/Network Management Forum, network managers have been best equipped to performing configuration and security management. Network managers can also provide limited fault analysis, but, in most cases, only after failure has occurred. Recently, the development of larger networks, both LAN and WAN, which include multiple printer, communication, database, and file server locations have been contemplated. This drive towards combining increasing numbers of computer components into a single network, has led to an increased demand for greater management capabilities. While, in the past, failure alerts may have been satisfactory, there is an increasing demand for information that will lead to failure whereby potential failures may be reported in sufficient time to allow for corrective action before an actual failure occurs. In addition to this increased demand for information that will lead to failure, the capability of real-time analysis of the performance of a computer system is also seen as a highly desirable management capability, particularly in the development of larger, multiple file server networks which will challenge minicomputers and mainframe for larger scale applications. Furthermore, as many of such networks will utilize a WAN configuration, the need to be able to manage the network from a remote console is of increased importance. Total reliance on local management capabilities would be a significant detriment to such systems since at least one major component of the systems would likely be remotely located with respect to the remainder of the system, thereby producing a network unable to manage the entire system from a single management console or facility.

To improve the capability of the system manager to readily exchange information with the network operating system, thereby providing improved ability of the system manager to utilize the network in management operations as well as to provide for the capability of the system manager to generate alerts for the network, a communication link between the system manager and the network operating system will be required. In order to achieve such a link, a common set of conventions (or "protocol") for communications between the two must be provided.

SUMMARY OF THE INVENTION

The invention relates to a protocol for local data transfers between a system manager for a computer system and a network operating system associated with the computer system and a method for exchanging command and response messages between the system manager and the network operating system using a bus master interface provided between the two. The bus master interface includes a pair of doorbell registers, a semaphore register and a mailbox register for transferring command and command responses between the system manager and the network operating system. Various ones of the interface registers are reserved by the side transferring information, command written to the interface registers and the other side notified of the information transferred to the interface and the reservation released. The interface is also used to transfer responses to the side originating the command.

BRIEF DESCRIPTION OF THE DRAWINGS

The invention may be better understood and its numerous objects, features and advantages become apparent to those skilled in the art by referencing the accompanying drawing in which.

DETAILED DESCRIPTION OF A PREFERRED EMBODIMENT

Figure 1:
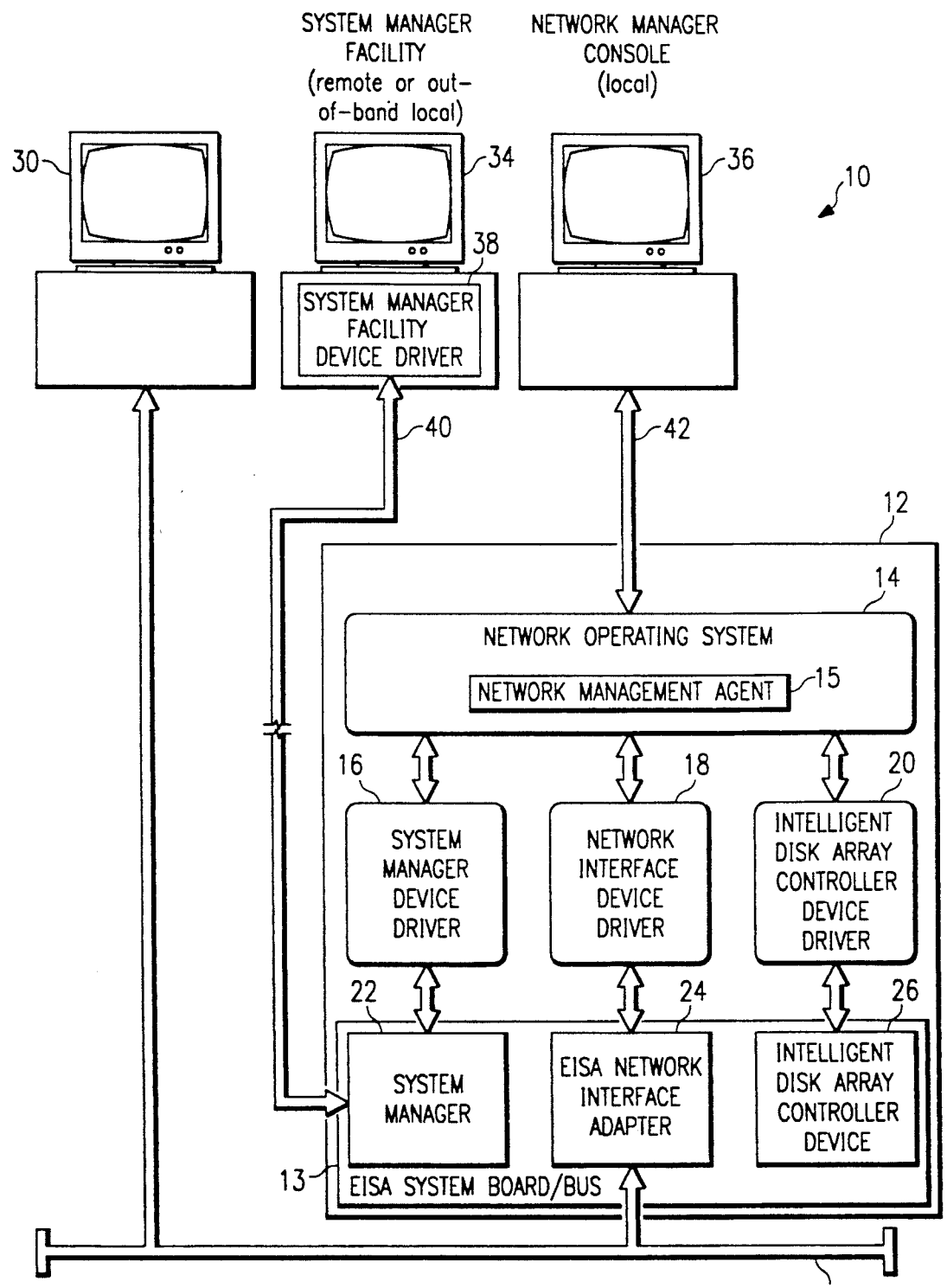
FIG. 1 is a block diagram of a computer network having an EISA based computer system and a computer system manager installed therein.

Referring first to FIG. 1, an extended industry standard architecture (or "EISA") based computer network 10 having a system manager 22 constructed in accordance with the present invention shall now be described in detail. The computer network 10, which may be configured as either a LAN, WAN or other type of network configuration, includes an EISA server 12, for example, a Systempro Model 486-840 manufactured by Compaq Computer Corp. of Houston, Tex., having an EISA based computer system board comprised of a series of computer subsystems (not shown) interconnected by a EISA based system bus. As the computer subsystems themselves are not specifically illustrated herein, the EISA computer system board and EISA system bus are, for ease of illustration, indicated as a unified element, EISA system board/bus 13, although all specific references to such element shall specifically indicate which portion of the unified element is being considered in such reference.

Installed on the EISA computer system board 13 are a plurality of cards which include the system manager 22, which, as will be more fully described below, is comprised of a 32 bit intelligent bus master board and supporting firmware, an EISA network interface adapter 24 and an intelligent disk array controller device 26. Installed in the operating system (or "OS") section of the EISA server 12 is a network operating system 14, preferably one which includes a network management agent 15. It is contemplated that any one of numerous network operating systems, for example, the NetWare or LAN Manager network operating systems previously described, would be suitable for use as the network operating system 14.

Interfacing the system manager 22 and the network operating system 14 is a system manager device driver 16. The system manager device driver 16 acts as a bi-directional translator for all requests to and from the system manager 22, thereby providing two-way communication between the system manager 22 and the network management agent 15. Through this interconnection between the system manager 22 and the network management agent 15, the network management agent 15 may supply information to or receive information collected by the system manager 22. Object management by the system manager 22 may, therefore, be initiated by the network management agent 15 if the network management agent 15 issues instructions to create, delete, modify, reset, or clear objects stored in the system manager 22.

The system manager device driver 16 will also handle certain in-band and out-of band alerts. If generated by the system manager 22, an in-band alert will be transmitted by the system manager device driver 16 to the network operating system 14 which, under the control of the network management agent 15, will direct the in-band alert to a local network manager console 36 connected to the network operating system 14 by in-band network bus 42. Out-of-band alerts generated by the network operating system 14, on the other hand, will be transmitted by the system manager device driver 16 to the system manager 22 for transmission to a remotely located system manager facility 34 connected to the system manager 22 via an asynchronous link 40, for example, a telephone connection. Two-way communication between the system manager 22 and the remotely located system manager console is provided by a system manager facility device driver 38. While there are additional signals transmitted between the system manager 22 and the network operating system 14 by the system manager device driver 16, these additional signals shall be discussed in greater detail later.

The network management agent 15 also operates as a central collection point for network management information for the EISA server 12 by acting as a link between the system manager 22, other cards installed on the computer system board 13, and the computer network itself. For example, in the embodiment of the invention illustrated in FIG. 1, an EISA network interface adapter 24, for example, a Model NE3200 32-bit Ethernet adapter manufactured by Anthem Electronics, Inc., and ann intelligent disk array controller device 26, are also installed on the computer system board 13. The network operating system 14 connects the computer system board 13 and, via a network interface device driver 18 which operates in a manner similar to the system manager device driver 16, the network interface adapter 24 for two-way data transmission therebetween. Furthermore, as the network interface adapter 24 is connected for two-way data transmission with the network 28, a two-way communication link between the system manager 22 and the network 28 is thusly provided. The network 28 is the interface of the network components via the network media. The network 28 may be configured in a Token Ring, Ethernet, or other network topology in use today, to control the access of multiple computer stations to the network 28, although, in the embodiment of the invention described and illustrated herein, a single computer station 30 has been provided.

An intelligent disk array controller device driver 20 which, like the network interface device driver 18, operates in a manner similar to the system manager device driver 16, provides for two-way data transmission between the system manager 22 and, via the network operating system, the intelligent disk array controller device 26. The intelligent disk array controller device 26 provides disk storage for the computer system board 13. For example, it is contemplated that the intelligent disk array (or "IDA") controller device 26 may provide 840 Mbytes of disk storage for the computer system board 13 by associated four 210M-byte Compaq IDA drive pairs therewith.

Figure 2:
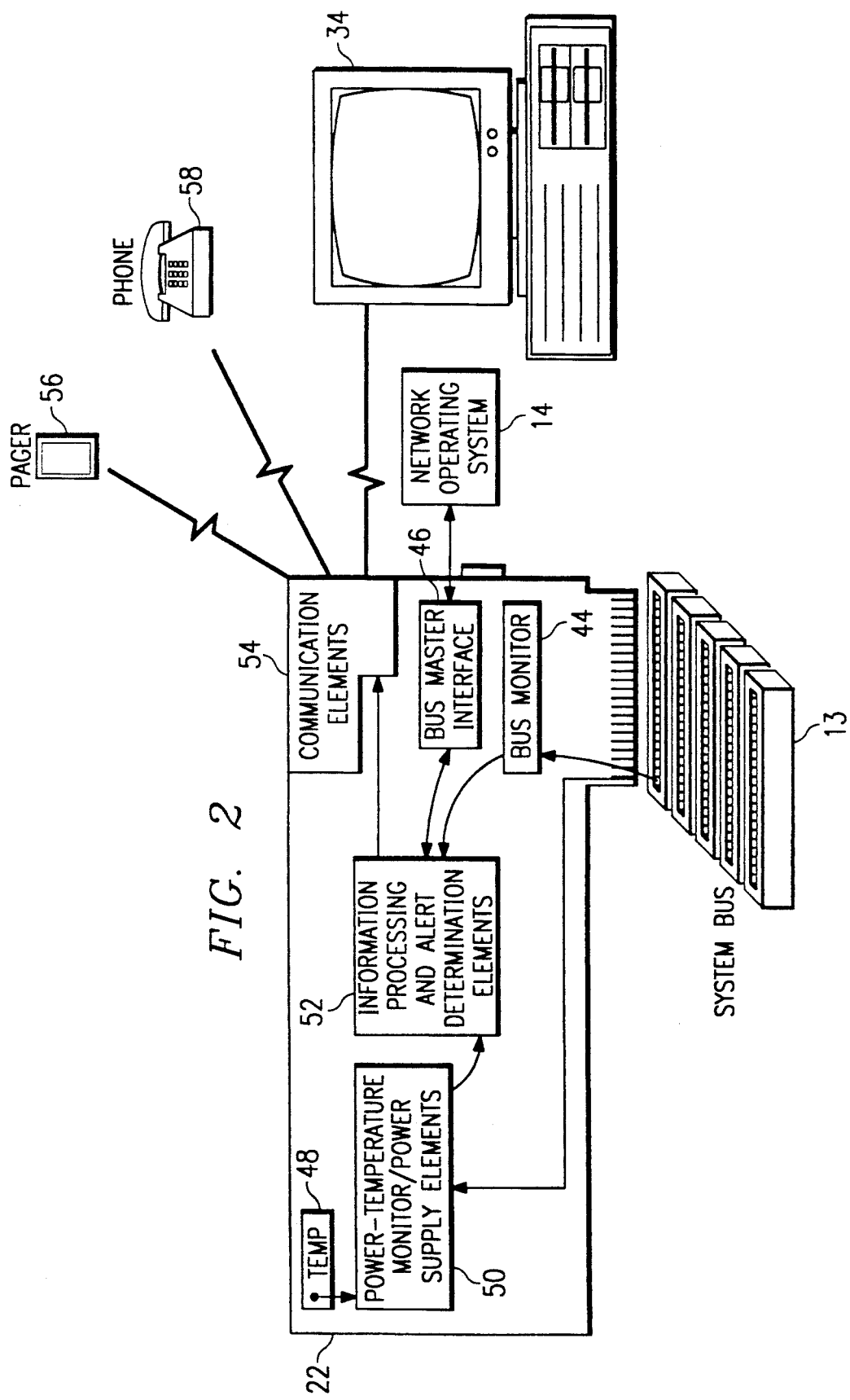
FIG. 2 is a block diagram of the system manager of FIG. 1 which illustrates information flow to and from, as well as within, the system manager.

Referring next to FIG. 2, the flow of information, most commonly in the form of data and alerts, to and from, as well as within the system manager 22 shall now be described in greater detail. As will be more fully described below, the system manager 22 has the ability to monitor various system components and parameters. If a component experiences a failure or exhibits characteristics that indicate it may experience a failure, the system manager 22 detects the failure or characteristic indicative of a potential failure and reports the failure or characteristic indicative of a potential failure as an alert in a manner such that corrective action can be taken.

As may be seen in FIG. 2, the path by which data accumulated during the monitoring of system components and parameters indicative of an actual or potential failure may be any one of four paths, depending on the particular type of actual or potential failure being monitored. Each system component being monitored may be referred to as an object having a number of attributes. As the components continue to be monitored, the value of the object's attributes may change, for example, by incrementing, decrementing, updating, resetting or modifying. When the attributes exceed their boundary or threshold value, an alert will be generated. In addition to alerts, the attributes of objects may be utilized to provide continuous real-time monitoring of the computer system board 13 without interfering with normal system operations.

Addressing the specific signals being monitored by the system bus manager 22, the computer system bus 13 supplies certain signals to a bus monitor 44 which will help determine the state of the computer system board 13. These signals include interrupt request (or "IRQ") signals, data memory request (or "DRQ") signals and input/output (or "I/O") signals. In one embodiment of the invention, it is contemplated that the bus monitor 44 monitors the I/O signals although, in a further embodiment of the invention, it is contemplated that the bus monitor 44 monitors the supplied IRQ, DRQ and I/O signals. If the signals are active, then the corresponding system resources are being used. In this manner, these signals may be used to monitor the performance of the computer system board 13. Other signals supplied by the computer system bus 13, are utilized during object management to indicate alert conditions. For example, the absence of the refresh signal will generate an alert since the lack of refresh may cause the file server 12 to fail. Similarly, an indication of a memory parity error will cause the generation of an alert. Also innately monitored by the bus monitor 44 are the printer port, so that the system manager 22 can report whether or not there is a printer error or is out of paper, the asynchronous serial port, so that the system manager can monitor and log asynchronous activity such as overrun errors, parity errors, and framing errors for system board serial ports, system software, so that software errors can be identified, and keyboard events, so that keystrokes can be logged and the relationship between a system failure and keyboard inputs can be analyzed. Finally, the bus monitor 44 will detect the assertion of IOCHK, indicative of a catastrophic board failure, and board "times out", indicative of a violation of EISA standards. The bus monitor 44 transfers these signals to information processing and alert determination elements 52 where the monitored information is processed. As will be more fully described below, the information processing and alert determination elements 52 of the system manager 22 is comprised of a control processor and supporting logic which, by the application of object management techniques, is configured to determine whether the monitored information warrants the generation of an alert.

The system manager 22 further provides for the monitoring of other signals for delivery to the information processing and alert determination elements 52 for potential generation of alerts. These other signals are supplied to the information processing and alert determination elements 52 by a path distinct from that previously discussed. To power the system manager 22, the computer system bus 13 provides $\pm 5$ Volt and $\pm 12$ Volt lines to a power-temperature monitor/power supply elements 50. The level of voltage supplied to the system manager 22 is converted into a digital signal by an analog-to-digital converter included in the power-temperature monitor/power supply elements 50 and the digital power level signal is provided to the information processing and alert determination elements 52. For example, if a drop in system power is detected, the information processing and alert determination elements 52 will generate an alert. If, however, a complete loss of power occurs, the system manager 22 will switch to battery power and the event reported, again as an alert, through one or both of its asynchronous modem and serial connections. This aspect of the system manager 22 is more fully described in co-pending patent application Ser. No. 07/719,394 entitled "Power Supply for a Computer System Manager" and previously incorporated by reference. Briefly, however, after loss of system power, the system manager will switch into reserve power to deliver alerts and, after completing alert delivery, to standby mode to conserve power. After reserve power is exhausted, the system manager then switches into dormant mode to keep its RAM memory valid for an extended period of time and, after the expiration of the extended period of time, cut power off completely.

The system manager 22 is further provided with a temperature sensor 48. The internal temperature of the system manager 22 is continuously monitored by the temperature sensor 48 and the measured temperature transmitted to power-temperature monitor/power supply elements 50 where analog to digital conversion of the monitored temperature is performed. The digital temperature level is then transmitted to information processing and alert determination elements 52 for object management. If the information processing and alert determination elements 52 determine that the temperature has risen above a predetermined threshold, then an alert may be issued.

Finally, a bus master interface 46 is used to transfer certain signals from the network operating system 14 to the information processing and alert determination elements 52. Typically, the information provided by the bus master interface 46 differs from that passively supplied by the bus monitor 44 or the power-temperature monitor/power supply elements 50 in that information supplied via the bus master interface 46 are supplied as hard inputs. However, by interfacing with network operating system 14, the system manager 22 can monitor network resources other than the computer system board 13 itself. For example, in a typical network management system, the intelligent disk array controller device 26 would provide management information to the network management agent 15 such as the number of read errors that have occurred. In turn, the network management agent 15 can provide that information to the system manager 22 via the bus master interface 46.

The information passively monitored by the bus monitor 44 and the power-temperature monitor portion of the power-temperature monitor/power supply elements 50 and supplied to the information processing and alert determination elements 52, as well as that information supplied to the information processing and alert determination elements 52 by the bus master interface 46 may be used for several purposes. First, the information processing and alert determination elements 52 can process the information and, if appropriate, generate an alert. Examples of alert conditions that may be determined by information processing and alert determination elements 52 include loss of system power, server subsystems failure, excessive server temperature as well as other configurable events that require outside attention.

Once the information processing and alert determination elements 52 determine that an alert should be issued, such an alert can be issued in a number of ways. Initially, it must be determined if the alert should be delivered "in-band" or "out-band". Once originated by the information processing and alert determination elements 52, an in-band alert is directed to the bus master interface 46 and on to the network operating system 14 and, under the control of the network management software contained in the network management agent 15, on to the local network manager console 36. So that the use of existing network hardware is maximized, it is contemplated that in-band alerts to the local network manager console 36 will be utilized as the primary path for communications with the system manager 22. It should be specifically noted, however, that, a local system manager console may be used to receive in-band alerts without departing from the practice of the present invention. If the information processing and alert determination elements 52 determine that the alert should be issued "out-of-band", the alert is transmitted to communication elements 54 where an alert is issued. As is more fully described in co-pending U.S. patent application Ser. No. 07/720,258 entitled "In-band/Out-of-band Alert Delivery System" and previously incorporated by reference, the communication elements may send an out-of-band alert by sending a protocol message over a switched telephone connection to the system manager facility 34, by dialing a phone number associated with a pager 56 or by dialing a phone number to a phone 58 associated with a person and generating a synthesized voice message upon completing a connection with the phone 58.

In addition to alert determination and generation based upon the passively monitored information, the information processing and alert determination elements 52 also perform several other functions. More specifically, the received information is also time stamped and stored or "logged" into RAM memory for later access. Thus, in the event of a catastrophic failure of the file server 12, the monitored and logged information will be available for "post mortem" diagnostics. Similarly, network information may be transferred over the bus master interface 46 and logged into RAM memory contained within the information processing and alert determination elements 52. Finally, the objects can be transferred, for example to the remote system manager facility 34 or the local network manager console 36 to provide real-time information regarding the performance of the system manager 22.

Through the link between the communications elements 54 of the system manager 22 and the system manager facility 34, significant control of the system manager 22 can be performed from a remote location. From the system manager facility 34, remote console emulation, access to stored data and remote control or "rebooting" may be performed. Remote console emulation or "hard key insertion" permits keystrokes at the remote control to be delivered to the system manager 22 as if they were input locally. Through the hard key insertion, "soft" reboots are emulated by simultaneously inserting "control"—"alt"—"del" to actuate a reboot of the system manager 22. While not being able to actuate a complete "hard" reboot, the system manager facility 34 can simulate a hard reboot. More information regarding remote console emulation is set forth in co-pending U.S. patent application Ser. No. 07/719,243 entitled "Remote Console Emulator for a Computer System Manager" and previously incorporated by reference.

Figure 3:
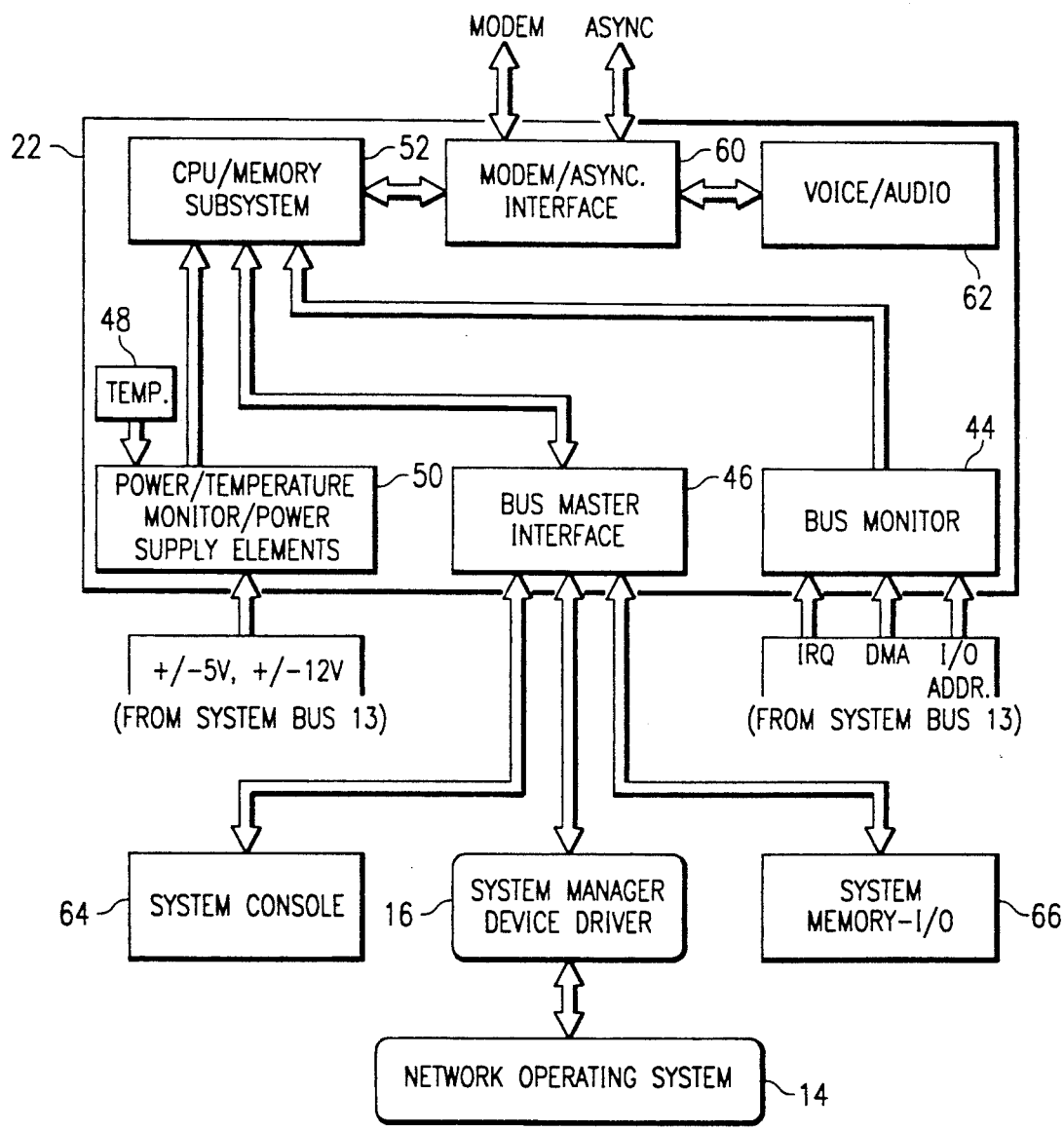
FIG. 3 is a top level block diagram of the system manager of FIGS. 1-2.

Referring next to FIG. 3, the structural configuration of the system manager 22 shall now be described in greater detail. While quite similar to FIG. 2, certain elements of the system manager 22 have now been redesignated to more closely describe their structural configurations whereas, in FIG. 2, such elements were designated with their operational characteristics closer in mind. As may be better seen in FIG. 3, the bus monitor 44 innately monitors a plurality of signals relating to the state of the computer system board 13. Innate monitoring is accomplished by the bus monitor 44 receiving all data and address signals being transferred along the system bus 13. The bus monitor 44 will then select those signals which will help determine the state of the computer system board 13 and directs the selected signals via a bus to, what previously was functionally designated as the information processing and alert determination elements 52 and what is now structurally designated as a CPU/memory subsystem 52 which is the hardware which, together with associated firmware, will perform the aforementioned information processing and alert determination functions. Other signals, indicated here as miscellaneous system signals, are always considered to help determine the state of the computer system board and are directed through the bus monitor 44 to the CPU/memory subsystem 52. Additionally, the system bus 13 supplies power to the system manager 22 via ±5V, ±12V lines to the power-temperature monitor/power supply element 50 and on to the CPU/memory subsystem 52. In the event that the supply of power from the system bus 13 is terminated, the power-temperature monitor/power supply element 50 will begin supplying power from a battery included therein. The termination of the supply of power from the system bus will also be reported to the CPU/memory subsystem 52 as an alert condition.

Connected to output of the CPU/memory subsystem is a modem/asynchronous interface 60 represents the two paths along which an out-of-band alert may be transmitted, via an asynchronous communication port or via a modem, in the event that an alert condition has been established. Alert conditions include loss of system power, server subsystem failure, excessive server temperature as well as other events which require the attention of the system manager facility 34. Either of these may be used to report an alert condition, although the modem would typically contact either one of the pager 56 or the phone 58 while the asynchronous communication port would typically contact a remote system manager, for example the system manager facility 34 illustrated in FIG. 2. Servicing the modem/asynchronous interface 60 is voice/audio elements 62. In the event that a voice alert is selected, the voice audio elements generate the voice alert which is then transferred to a phone 58 via the modem. Finally, in the system manager configuration illustrated herein, a local system manager console 64 and system memory I/O support the system manager 22 and are accessible via the bus master interface 46.

Figure 4:
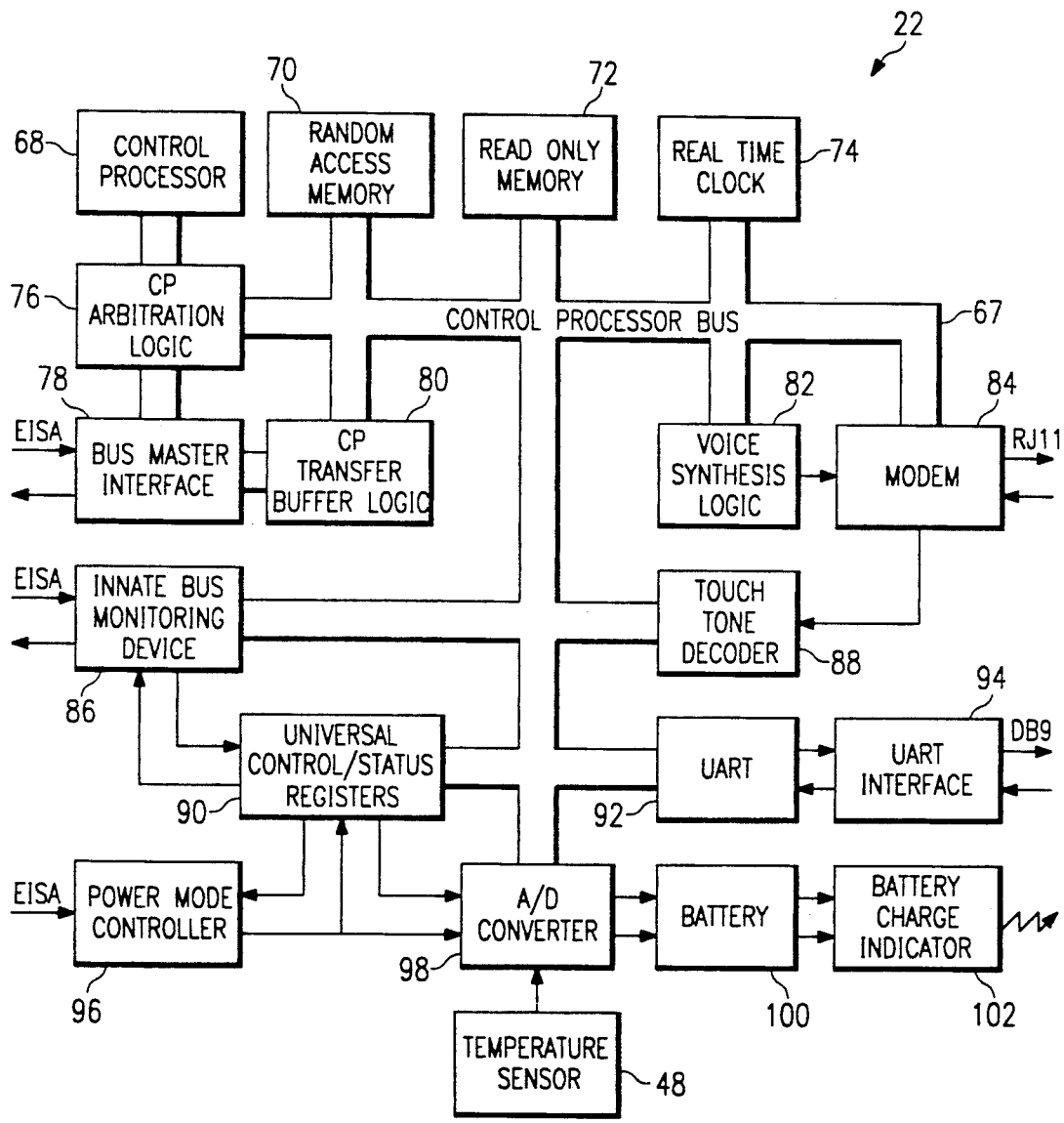
FIG. 4 is a low level block diagram of the system manager of FIG. 3.

Referring next to FIG. 4 the system manager 22 shall now be described in still greater detail. The system manager 22 is comprised of a bi-directional control processor bus 67 and a series of system manager components connected to the control processor bus 67 for the transfer of address, data and control signals between various components of the system manager 22. Connected to the control processor bus 67 are a control processor 68, random access memory 70, read only memory 72, a real time clock 74, control processor arbitration logic 76, a bus master interface 78, control processor transfer buffer logic 80, voice synthesis logic 82, a modem 84, a innate bus monitoring device 86, a touch tone decoder 88, universal control/status registers 90, a universal asynchronous receiver transmitter (or "UART") 92, a UART interface 94, a power mode controller 96, an analog-to-digital converter 98; and indirectly a battery 100 and a battery charge indicator 102 and a temperature sensor 48.

The various operations performed by the system manager 22 and the various system manager components 48 and 68–102 which are utilized to perform such operations shall now be described in greater detail. In the embodiment of the invention disclosed herein, the control processor 68 is a 16 bit microprocessor which operates at 16 MHz, although, in alternate embodiments of the invention, other microprocessor types will be suitable for use. The control processor 68 performs multiple tasks, including a primary task of collecting and storing information received from multiple sources, detecting failures based upon acquired data and issuing alerts as appropriate. The control processor 68 also performs several other tasks which will be described in greater detail later. In its primary task, object data which is processed by the control processor 68 is stored in the random access memory 70 and processor instructions are stored in the read only memory 72. Depending on the particular object management performed on a particular system component, data from the computer system bus 13 and innately monitored by the innate bus monitoring device 86 may be operated on by the control processor 68 and the resultant object stored in the random access memory 70 or, depending on the particular object being managed, may be directly stored into the random access memory 70. Similarly, temperature and-/or power data transmitted by the A/D converter 98 may be operated on by the control processor 68 and the result stored in the random access memory 70 or may be directly stored into the random access memory 70. The real time clock is a clock independent of the system clock which is configured to store data, time, year and other time related variables relating to objects, depending on user preference.

In "normal" operation, the control processor 68 controls the control processor bus 67 to provide data transfers between the control processor 68, the random access memory 70, the read only memory 72 and the real time clock 74. In normal operation, the control processor 68 performs object management as set forth in detail elsewhere. Based upon the acquired data, object management will provide for the detection of failures of the file server 12 or subsystems thereof.

The bus master interface 78 which, for example, may be an Intel 82355 BMIC, is configured to interrogate and modify the memory and I/O space 66 of the computer system 12 as well as the random access memory 70 of the system manager 22. For example, during a "data transfer operation" involving the system manager 22, the control processor arbitration logic 76 instructs the control processor bus 67 regarding the address, direction and destination of the data transfer. The control processor arbitration logic 76 then instructs the bus master interface 78 as to the transfer. Once the system manager 22 is ready for a transfer, the bus master interface 78 will then instruct the computer system bus 13 to arrange for a burst transfer of data to the bus master interface 78 which, in turn, will transfer the data, to the control processor transfer buffer logic 80 and on to the random access memory 70 for storage. Transfer of data from the random access memory 70 to the bus master interface 78 is accomplished in reverse manner.

Once, object management within the control processor 68 has indicated that an alert should be generated, the control processor 68 controls the delivery of the appropriate alert message via the modem 84, the UART 94 and/or the network operating system 15. The UART 94 provides an asynchronous interface between the system manager 22 and the system manager facility 34. Through a software interface provided between the UART 94 and the system manager facility 34, for example, by use of the Windows software, the system manager facility 34 is capable of reading monitored object values from and writing object control to the system manager 22. Likewise, video screen data can be transmitted from the system manager 22 to the remote control and keystrokes can be transmitted from the system manager facility 34 to the system manager 22. The system manager facility 34 also keeps alert logs. Finally, another function of the UART 94 is to connect an external modem to deliver page alerts under the control of the control processor 68.

As previously mentioned, alerts delivered to the pager 54 or the phone 56 are made via the modem 84 under the control of the control processor 68. When, however, an alert message is delivered to the phone 56, the voice synthesis logic 82 is utilized by the control processor 68 in order to generate an audible, voice alert. Pre-recorded voice messages are stored within the voice synthesis logic 82. These voice messages, which are stored in accordance with adaptive differential pulse code modulation, relate to a multitude of messages which may be accessed by the control processor and transmitted. For example, dates, numbers, alert conditions, names, voltages which correspond to the information useful to identify the information regarding alert conditions. Thus, if the control processor desired to transmit a voice alert, the control processor 68 would instruct the voice synthesis logic 82 to supply the selected message to the modem 84, which, for example may be a 2400 bit per second modem, can transmit the selected message over its two way interface with the phone 58. After the alert has been transmitted, the modem 84 will await a return call through which it will pass server information and control.

The touch tone decoder 88 is connected to accept analog signals from the modem 84. The touch tone decoder 88 decodes signals received by the modem and informs the control processor as to the nature of the signal. Most commonly, the touch tone decoder will be used to provide security for the system manager 22. For example, when an alert delivery is sent via the modem 84 to a pager 56 or a phone, a user receiving the alert will, in many situations, desire to contact the system manager 22 for additional information. For example, if the user transmits a password to the modem 84, the touch tone decoder 88 will decode the tones and transmit the decoded tones to the control processor 68. The control processor 68 then decides whether the password is legitimate. As will be more fully described in co-pending application Ser. No. 07/719,243, entitled "Remote Console Emulator for System Bus Manager", and previously incorporated by reference, the touch tone decoder 88 is also utilized in connection with remote console emulation operations. The power mode controller 92 both controls the power for the system manager 22 and monitors the power level for the system board. In a manner more fully described in co-pending application Ser. No. 07/719,394, entitled "Power Supply Controller for Computer System Manager", and previously incorporated by reference, the power mode controller will control the operation of the system manager 22 by designating which of alternate power modes the system manager 22, or in accordance with the requirements of certain power modes, which components of the system manager 22 are to be supplied power. In the event that power from the system bus 13 is unavailable, the battery 100 shall supply power to either the system manager 22 or to selected components thereof. As the battery 100 is rechargeable, the battery charge indicator 102 is provided to indicate when the battery 100 is being recharged. For example, the power mode controller 92 will cause the system manager 22 to activate the battery 100 should the supply voltage needed to operate the system manager 22 fall below a minimum operating voltage. The power mode controller 92 will also turn on and off devices not needed during operation of the battery 100. This circuitry will provide the best use of the battery 100 in this low power mode. After the processor delivers an alert, the power mode controller 92 will turn off the power to the control processor 68. The processor will be restarted when a call is detected, UART activity, expiration of set interval in real time clock and other system activity or subsystem activity.

Figure 5:
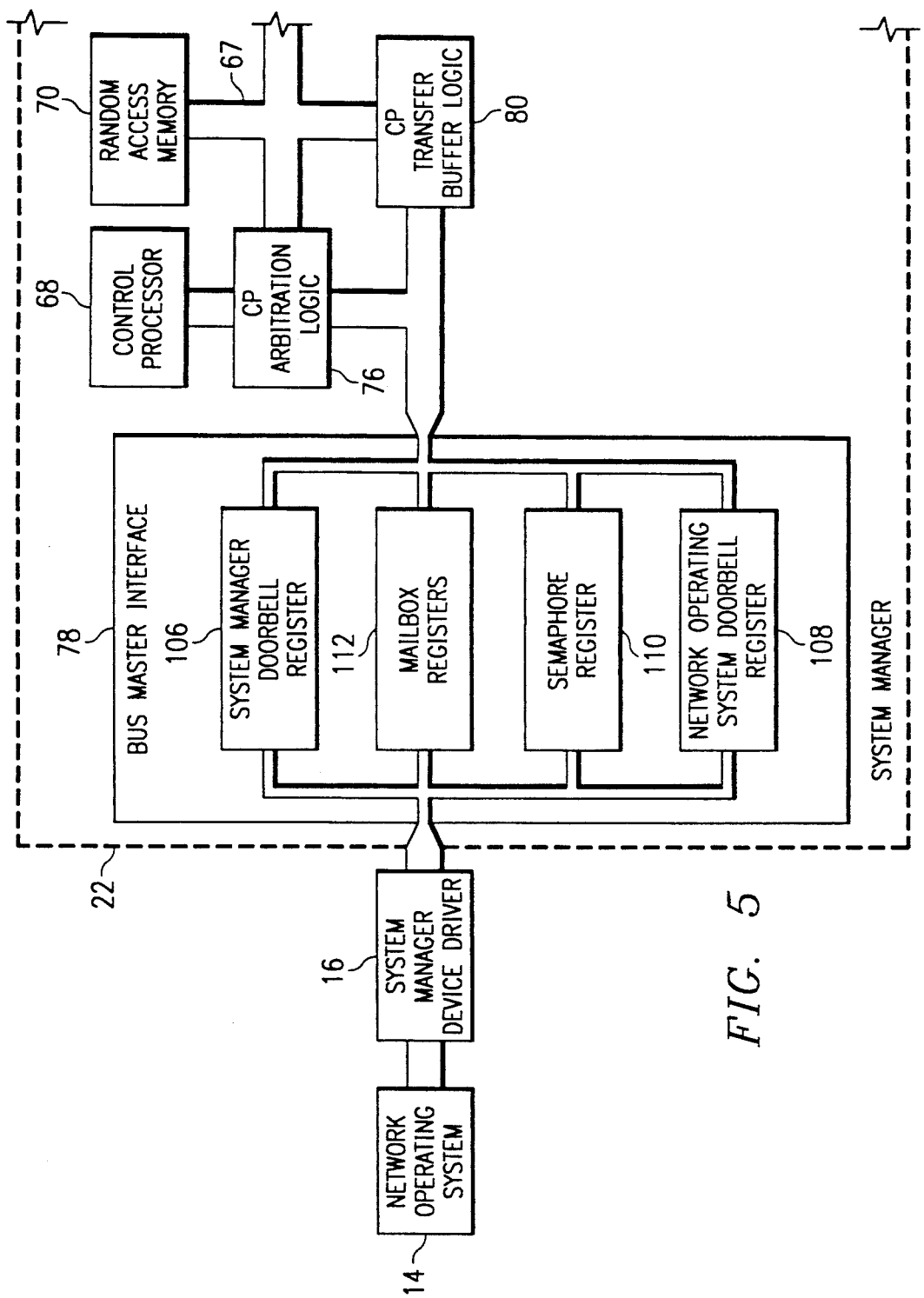
FIG. 5 is a low level block diagram of the interconnection between the system manager and the network operating system at the bus master interface.

Referring next to FIG. 5, two-way communications between the system manager 22 and the network operating system 14 via the bus master interface 78 will now be described in greater detail. As previously discussed, the bus master interface 78 provides the necessary interface for communications between the the various components of the system manager 22 and, via the system manager device driver 16, the network operating system 14. To permit communications between the two, the bus master interface includes a pair of doorbell registers: a system manager doorbell register 106 and a network operating system doorbell register 108. Each doorbell register 106, 108 is a dual ported set/reset register accessible by both the system manager 22 and the network operating system 14. The system manager doorbell register 106 is configured such that it is set by the system manager device driver 16 and reset by the control processor arbitration logic 76 of the system manager 22. Similarly, the the network operating system doorbell register 108 is set by the control processor arbitration logic 76 and reset by the system manager device driver 16.

Bits 0 and 1 of the doorbell registers 106, 108 are used with the command passing protocol. When bit 0 of a doorbell register is set to 1, a command from the other side is waiting to be processed. When bit 1 is set to 1, the command has been transferring and error information is waiting to be read into the mailbox registers. If the test bit of the semaphore register 110 is not set, the mailboxes are available for use. Bits 2-7 are reserved. Each doorbell register 106, 108 includes a mask register (not shown) which is used to generate an interrupt when the doorbell register is set. Thus, when the system manager device driver 16 sets the system manager doorbell register 106, the mask register of the system manager doorbell register 106 generates an interrupt and transmits the interrupt to the system manager 22. Similarly, when the control processor arbitration logic 76 sets the network operating system doorbell register 108, the mask register of the doorbell 108 generates an interrupt which is transmitted to the system manager device driver 16. In this manner, the doorbell registers 106, 108 inform the corresponding system associated therewith that the system on the other side of the doorbell wishes to transmit information thereto.

The bus master interface further includes a semaphore register 110 accessible by both the system manager device driver 16 and the control processor arbitration logic 76. The semaphore register is used to lock access to mailbox registers 112 so that only one data transfer may be performed at a time. The semaphore register 110 includes two data bits: a flag bit (bit 0) and a test bit (bit 1). In order to determine if the system manager device driver 16 or the system manager 22 can access the mailbox registers 112, either the system manager device driver 16 or the control processor arbitration logic 76 will set the flag bit of the semaphore register 110. When the flag bit is set, the semaphore register copies the previous flag bit value to the test bit. The system attempting access to the mailbox registers 112 will then test the test bit and, if the test bit is not set, the mailbox will be available for that element. Furthermore, as the flag bit of the semaphore register 110 is set by the system attempting access to the mailbox registers 112, the mailbox registers 112 are reserved for that system.

Finally, the bus master interface 78 is provided with the mailbox registers 112 which, like the doorbell registers 106, 108 and the semaphore register 110, is accessible by both the system manager 22 and the network operating system 14. The mailbox registers 112 are 16 bytes wide and are shared between the host side (network operating system 14 and system manager device driver 16) and the local side (system manager 22 and associated elements) for transferring command information in either direction. Command information is transferred from one side (either host or local) to the mailbox registers (and, upon performance of the appropriate command passing protocol) will then be transferred to the other side (local or host). As to be more fully described below, the command passing protocol utilized the doorbell register 106 and 108 to alert the either the local side or the host side to an awaiting command or to an indicator that a command has been completed.

As previously mentioned, the mailbox registers 112 are 16 bytes wide, each byte corresponding to one of 16 registers. Of these, mailbox registers 0 through 7 are valid for the transfer of command information from the network operating system 14 to the system manager 22. Mailbox registers 8 through 16 are reserved. The mailbox registers 112 are configured as follows:

TABLE I

| Command Addr LSB (byte) |
| Command Addr LSB+1 (byte) |
| Command Addr MSB−1 (byte) |
| Command Addr MSB (byte) |
| Command Size Lo (byte) |
| Command Size Hi (byte) |
| Return Code (byte) |
| Extended Return Code (byte) |

The command address is a 32 bit address used to transfer the command to and/or from the network operating system 14 and is stored in mailboxes 0-3. The command size is the size in bytes of the command to transfer to and/or from the network operating system 14 and is stored in mailboxes 4-5. The maximum size of which is 4 Kbytes. The return code is stored in mailboxes 6-7. The return code is used to inform the network operating system 14 and/or the system manager 22 that the command has been completed. If an error occurs while processing a command, command processing ends and error information is returned in the return code mailboxes.

In a system manager 22 to network operating system 14 command transfer, the mailbox registers 112 are configured as identified in Table I with the exception that the only valid fields are buffer size (which is stored in mailboxes 4-5) and command identity (which is stored in mailbox 3). The remainder of the mailbox registers are filled by the network operating system 14 which command processing is completed on the host side. During this stage, the network operating system 14 writes over the command identity with the most significant byte of the network operating system buffer address. As before, data stored during a local to host transfer cannot exceed 4 Kbytes in size.

The buffer size tells the host how much buffer space the system manager 22 requires on the host to transfer the information. This size is stored in the same location as in a host to local transfer, i.e. mailboxes 4 and 5. The remainder of the mailboxes are filled with the buffer address, and error information when the host finishes processing the request. The buffer that is allocated by the host can be larger than requested but never smaller.

Figure 6:
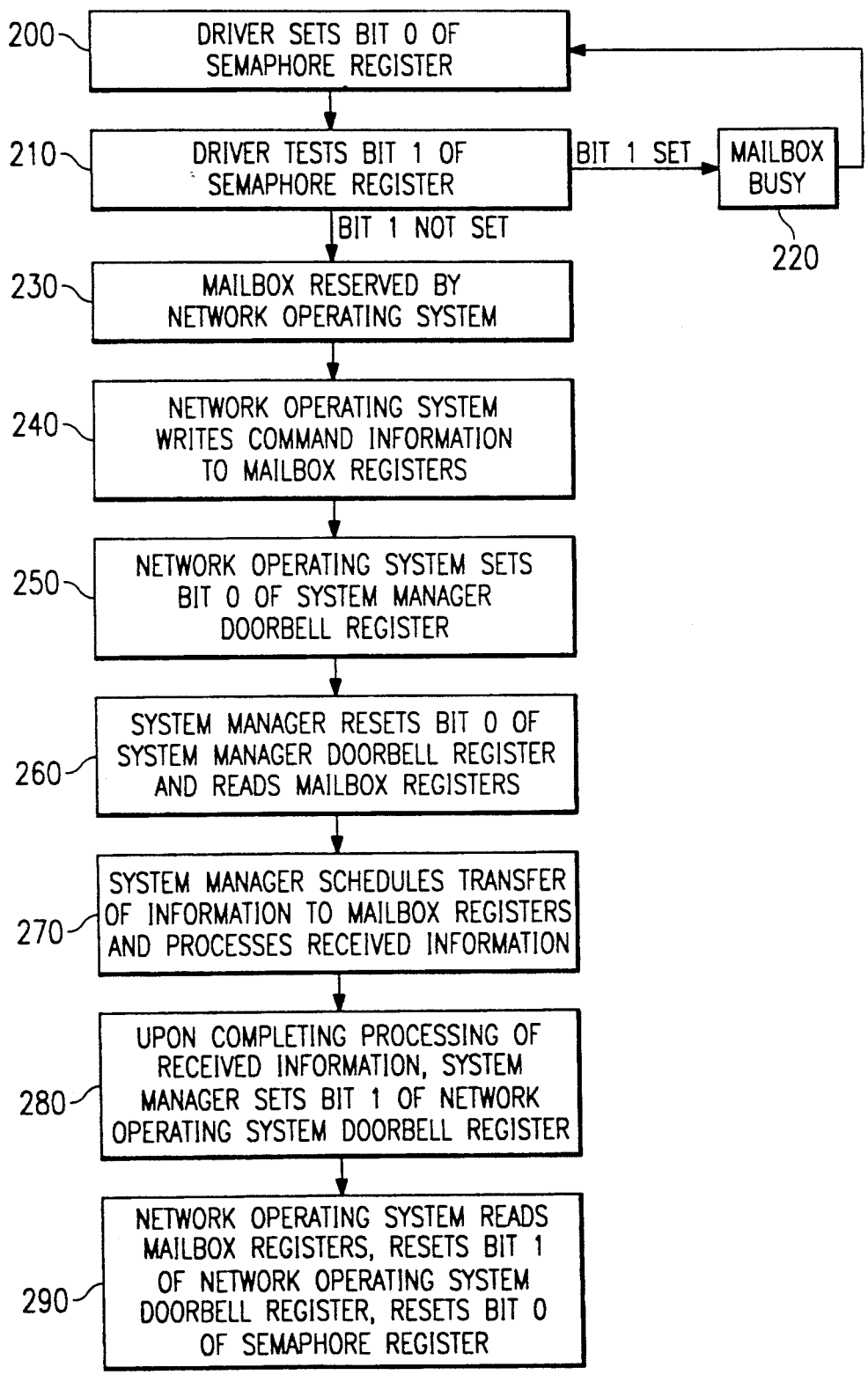
FIG. 6 is a flow chart illustrating the protocol for transferring information from the network operating system to the system manager.

Referring next to FIG. 6, the protocol for passing a command from the network operating system 14 to the system manager 22 shall now be described in greater detail. In performing a command transfer from the network operating system 14 to the system manager 22, the host driver (system manager device driver 16) sets bit 0 of the semaphore register. The semaphore register 110 will then transfer the prior value of bit 0 into bit 1. The system manager device driver 16 will then test bit 1 of the semaphore register 110. Thus, if, at the time the system manager device driver 16 sets bit 0, bit 0 has already been set, i.e., an access of the mailbox registers 112 has already been requested, the previously set bit 0 will be transferred to bit 1. If, on the other hand, an access of the mailbox registers 112 is not already in process, bit 0 of the semaphore register 110 would not have been set and this which would then result in bit 1 of the semaphore register 110 being not set as well.

The system manager device driver 16 then tests bit 1 of the semaphore register 110. If bit 1 is set, the mailbox registers 112 are in use and are being used for a different command transfer. If the mailbox registers 112 are in use, the system manager device driver will return to step 200 and attempt access again. If bit 1 of the semaphore register 110 is not set, the mailbox registers 112 are available for use and are reserved by the network operating system at step 230. This reserving of the mailbox registers 112 is accomplished by the prior setting of bit 0 of the semaphore register 110 which, in a next attempt to access the mailbox register 112 occurring later, will result in an indication that bit 1 is, thereby indicating that that the mailbox is busy.

Proceeding to step 240, the network operating system 14 writes command information to the mailbox registers 112 in accordance with the mailbox configuration previously illustrated and, proceeding to step 250, the network operating system 14 sets bit 0 of the system manager doorbell register 106. As previously discussed, this indicates to the system manager 22 that command information, i.e., command address and command size, are in the mailbox registers 112. Upon receiving this indication, most commonly in the form of an interrupt generated by the system manager doorbell register 106 and transferred to the system manager 22, the control processor arbitration logic 76 instructs the bus master interface as to the transfer. The control processor arbitration logic 76 initiates a transfer of the command data stored in the mailbox registers 112 to the control processor transfer buffer logic 80 and resets bit 0 to the system manager doorbell register 106. The control processor arbitration logic 76 then schedules the transfer of information based on the information received in the mailbox registers 112. Upon completing the transfer of information to the mailbox registers 112, the system manager 22 processes the command information read from the mailbox registers 112.

Proceeding to step 280, upon completing the processing of the received command information, the control processor arbitration logic 76 to the system manager 22 sets bit 1 of the network operating system doorbell register 108. By setting bit 1 of the doorbell register 108, the system board is signalling the network operation system 14 that the received command has been processed and corresponding error information has been placed in the mailbox registers 112. Accordingly, at step 290, the system manager device driver 16 reads the error information from the mailbox registers 112, resets bit 1 of the network operating system doorbell register 108 and resets bit 0 of the semaphore register 110. After resetting is complete, the bus master interface 70 is ready to control the transfer of another command in either direction.

Figure 7:
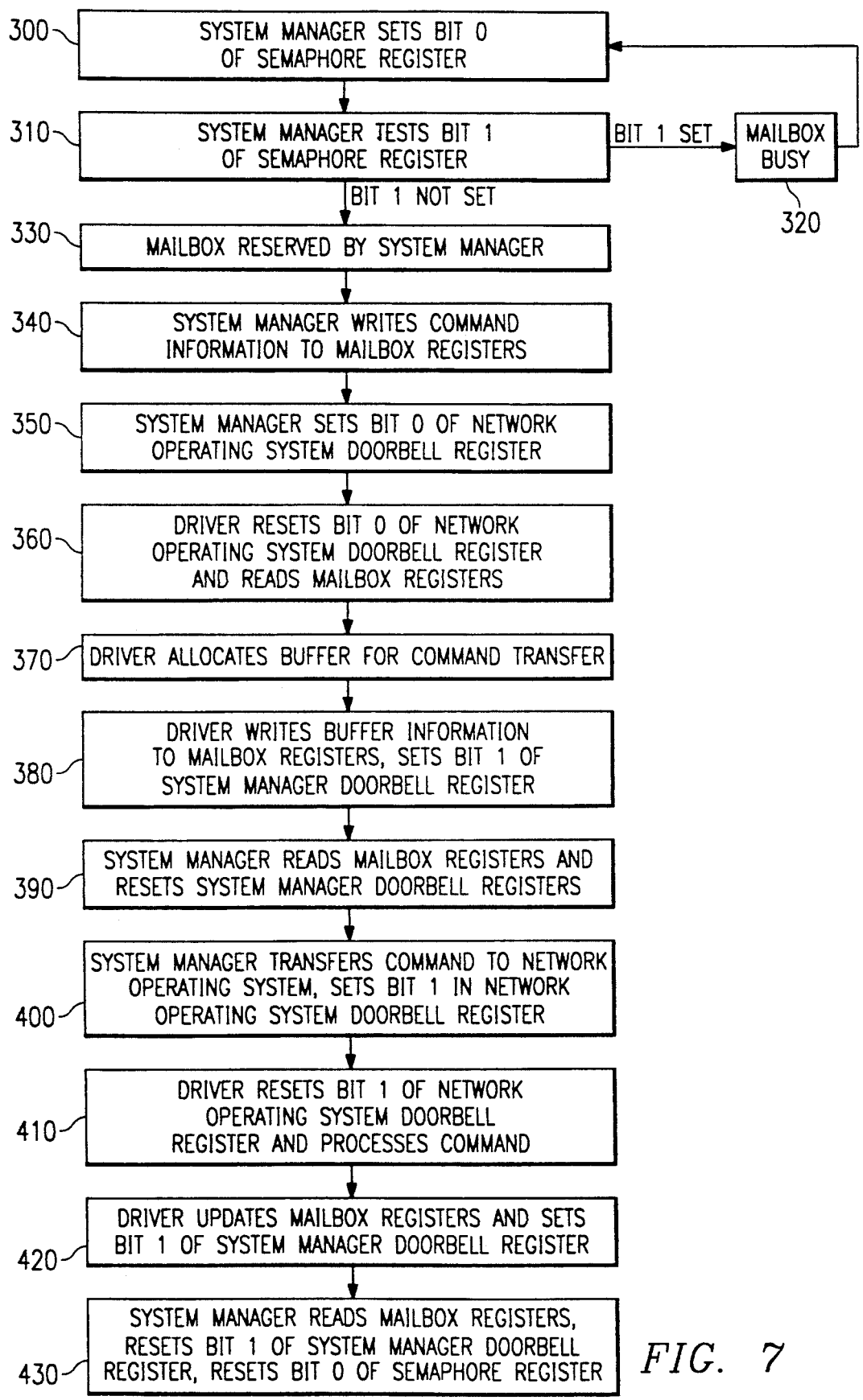
FIG. 7 is a flow chart illustrating the protocol for transferring information from the system manager to the network operating system.

Referring next to FIG. 7, the transfer of command information from the system manager 22 to the network operating system 14 shall now be described. Similar to the network operating system 14 to system manager 22 transfers previously described, the transfer of command information from the system manager 22 to the network operating system 14 commences at step 300 with the system manager 22 setting bit 0 of the semaphore register 110. Again, this causes the semaphore register 110 to transfer the prior value of bit 0 to bit 1. Proceeding to step 310, the system manager 22 then tests bit 1 of the semaphore register 110. If bit 1 is set, it is determined at step 320 that the mailbox registers 112 are busy and the command transfer protocol returns to step 300 where the system manager 22 will again set bit 0 of the semaphore register 110. If, however, it is determined at step 310 that bit 1 of the semaphore register 110 is not set, the system manager 22 will reserve the mailbox registers 112 at step 330.

Proceeding to step 340, the system manager 22 writes the size in bytes of buffer space that the network operating system 14 will require to receive the command information to be transferred thereto to the mailbox registers 112. The system manager 22 will also write the particular command being transferred to mailbox register 3. After transferring the command type and command size to the mailbox registers 112, the system manager 22 sets bit 0 of the network operating system doorbell register 108 at step 350, thereby informing the network operating system 14 that a command is awaiting, has been stored in the mailbox registers 112 and is awaiting transfer to the network operating system 14.

Proceeding to step 360, the system manager device driver 16 then resets bit 0 of the network operating system doorbell register 108 and reads the buffer and error information from the mailbox registers 112 to see how much buffer space the system manager 22 requires for the data transfer. Proceeding to step 370, the system manager device driver 16 allocates a buffer included therein to receive the data to be transferred and writes address and size information regarding the allocated buffer to the mailbox registers 112. The system manager device driver 16 further writes error information to the mailbox registers 112. Finally, the system manager device driver 16 sets bit 1 of the system manager doorbell register 106.

Proceeding to step 390, the system manager 22 reads the buffer and error information from the mailbox registers 112 and resets bit 1 of the system manager doorbell register 106. The system manager 22 then transfers a command to the buffer allocated by the system manager device driver 16 at step 400 as well as sets bit 1 of the network operating system doorbell register 108, thereby informing the network operating system 14 that the command transfer has been completed. At step 410, the system manager device driver 16 processes the command, updates the error field in the mailbox registers 112 and sets bit 1 of the system manager doorbell register 106. At step 420, the system manager device driver 16 updates the mailbox registers 112 with updated error information and sets bit 1 of the system manager doorbell register 106. Finally, at step 430, the system manager 22 reads the error information from the mailbox registers 112, resets bit 1 of the system manager doorbell register 106 and resets bit 0 of the semaphore register 110. The transfer of the command from the system manager 22 to the network operating system 14 is now complete and the bus master interface 78 is ready to transfer a next command.

The command passing protocol herein described utilizes the registers contained in the bus master interface 78 to pass a command address to the system manager 22 or the network operating system 14. In accordance with the methods of object management elsewhere described in this application, the object command acts on a single object and its related attributes. For example, a command may be sent to the system manager 22 to create a disk object with read errors and write errors as attributes.

Objects are the network management approach to data structures that allow the convenient packaging the categories of data. Each object represents a system component that can be managed. An object contains pertinent information about the component that it represents. As changes occur that affect the status of a component, the information contained in the object is updated. Objects are comprised of a collection of attributes. Each attribute is a descriptive part of the object. The objects are categorized into related classes. For example, a system board is a class. One of the objects in this class is system memory. An attribute of the object system memory is parity error count.

Attributes can have limit and threshold values. When a limit or threshold value is exceeded, the result is an alert. There are six types of attributes, each of which may be classified as a long attributes or a short attribute. Short attributes include counter, state and threshold attributes. These three short attributes cause alerts and log entries. The long attributes are data, string and queue.

Most commands to the system manager 22 act on objects. Every object has a 32 bit ID which may be used to reference the object. Similarly, each object attribute has an 8 bit identifier associated therewith. These identifiers allow access to the individual attributes within an object. Object attributes can be defined in a single command list or as a group. This permits attributes to be acts upon by a single command in a group or individually. A maximum of 128 objects can be created on the system manager.

Each object includes an object block header formatted in accordance with following:

Object Identifier (4 bytes)
Instance (byte)
Class (4 bytes)
Object log entries (byte)
Label (Null term. string (16 byte))
Attribute Offset (2 bytes)

where:

Object Identifier—The object identifier is a 32 bit value.

Instance—The instance byte is used to diminish objects with the same identifier. For example, a system could have multiple LAN cards all of the same type.

Class—The class bytes are used to group like objects together, for instance, disks, LAN cards, tape controllers, etc.

Object Log Entries—The object log entries byte is the number of entries in the activity log for the object. The log is limited to a maximum of 16 entries per object. This log will show a history of update activity for the object and will consist of the following 12 bytes per entry: date (3 bytes), time (3 bytes), command (1 byte), attribute ID (1 byte) and current value (4 bytes). The date and time are both binary coded decimal (or "BCD") data fields. Date is formatted MMDDYY and time is formatted HHMMSS in 24 hour time. String and data attributes types are not logged. Log entries occur when one of the following is performed on a counter, state or threshold: modify object attributes, increments, decrements, updates, and resets.

Null Terminated Label—The object label is a null terminated byte string used to better describe the object. The label is limited to 16 bytes including the null termination byte. If the label is less than 16 bytes, a 16 byte field should still be reserved in the header block. This label will be used as a textual representation of the object during the object display. For instance, "IDA Disk Cntl", or "NE3200 LAN Card" could be possible labels for disk controller and LAN card options, which will be used in altering messages for these objects.

Attribute Offset—The attribute offset is the offset to the top of the first attribute block header relative to the top of the object block header. The offset must always be positive. If this offset is zero, no attribute blocks follow. An object can be created and then its attributes can be added later.

The attribute block header describes the configuration for a single will have its own attribute block describing that attribute.

The format for an attribute block header for counter, state, and threshold (Short Attribute) is as follows:

> Attribute ID (byte)
> Attribute type (2 bytes)
> Voice Message Number (byte)
> Label (16 byte null terminated)
> Next Attribute Offset (2 bytes)
> Limit (4 bytes) (Low Threshold)
> Optional (4 bytes) (High Threshold)
> Default Value (4 bytes)

For data, string, and queue attribute types (long attributes), the attribute block header will be configured as follows:

> Attribute ID (byte)
> Attribute type (2 bytes)
> Voice Message Number (byte)
> Label (16 byte null terminated)
> Next Attribute Offset (2 bytes)
> 256 Byte Data, String, Queue where:

Attribute ID—The attribute identifier is a byte field containing an identifier used to find the correct attribute during updates to the attribute. It must be non-zero and other than OFFh. Different objects can have attributes with the same attribute identifier. Zero is a reserved identifier for object block header errors in the mailbox error word.

Attribute Type—The attribute type is a word size bit field describing in detail the attribute.

Voice Message Number—The voice message number is a number that will index into a list of possible errors.

Label—The label is a null terminated string similar to the label string in the object header, except it is used to describe the attribute. The combination of the object label, attribute label, and values associated with the object attribute, will compose the alert command.

Next Attribute Offset—The next attribute offset is the offset to the top of the next attribute header in the list from the top of the current attribute header. An offset of zero is used to denote the last attribute header in the list has been reached.

Limit and Optional—The limit and optional (for threshold these will be low threshold and high threshold) are all signed double words. The limit value field contains the limiting value for the attribute. This value will be compared to the current value to determine if an alert condition has occurred. For a threshold attribute, the attribute header will contain a low and high limit value. The high limit value will take the place of the optional value.

Default—The default value is the initial value stored in the current value field of the attribute upon creation or reset of the attribute.

256 Byte Data—The 256 byte data area will begin with a byte count followed by the free format data. The 256 byte string area will contain a null terminated string. The 256 byte queue area starts with a 1 byte offset to the top of the queue, followed by 255 bytes of queue area. All 256 bytes must be present in the command block even if they are not all used.

Counter, state, and threshold attributes can be: incremented, decremented, updated or reset.

For counter attributes, when the limit value for this attribute is passed, as specified by the meaning bits, an alert is signaled. An optional step value can be used to tell when the next alert should occur. Once an alert occurs the next alert will occur when the current value reaches the present current value plus the step value. The meaning bits apply to the step value in the same way they do for the limit value.

For state attributes, when the limit for this attribute is passed, as specified by the meaning bits, an alert is signaled. The optional value is not used for this type and is ignored.

A threshold attribute consists of a high and low threshold. For threshold attributes, the meaning bits associated with the threshold specifies if an alert will occur when the value associated with the thresholds is inside or outside the thresholds. For instance, with voltage thresholds of 4750 mv and 5250 mv the specified alert will be signaled when the voltage drops out of the threshold range.

A string attribute can be any data string the host would like to store for the attribute. This is a null terminated string of maximum length 256 bytes (255 bytes and a null terminator). No alerts are generated for string types. A 256 byte buffer must be allocated in the command even if it is not all going to be used. No alerts are valid for this data type.

A data attribute can include a maximum of 255 bytes of free form data storage. This data type is for storage of important system data, which cannot be stored in any other data type, and needs to be retrieved even after the system has gone down. This attributes type does not generate alerts. The first byte of the data area tells how many bytes of information are stored in the 256 byte block.

A queue data type is a data type that can be used for a 255 Byte circular queue of information. The first byte of the data block is the offset to the top of the queue inside the block. The following 255 bytes are reserved for the queue. The queue add command is a special command to operate on this attribute type. The queue is circular, so it will wrap around when the end of the data is reached. This attribute type does not generate alerts.

The following commands are used to manage objects. The return codes which include possible errors to be returned upon command completion are listed collectively later in the specification. Specifically, the return codes for each command consists of the possible errors listed for the specific command codes in the appendices set forth below.

1. CREATE OBJECT

Purpose

This command is used to create an object with or without its attributes. Attributes can be defined for the object at object creation or they can be added or modified with the modify or create object attributes commands. If no attributes are defined during the object's creation the attribute block header field should be left off and the attribute offset in the object block header should be zero.

| Command Format |
|---|
| Command (10h) (byte) |
| Object Block Header |
| Attribute Block Header |

2. MODIFY OBJECT

Purpose

This command is used to modify parameters in the object block header. Attributes cannot be modified with this command, only the object. The attribute offset field should be zero because no attribute will ever follow the object block header. The system manager provides the date and time for the log.

| Command format |
|---|
| Command (11h) (byte) |
| Object Block Header |

3. DELETE OBJECT

Purpose

This command may be used to delete an object, its attributes and related log information.

| Command Format |
|---|
| Command (12h) (byte) |
| Object ID (4 bytes) |
| Instance (byte) |

4. GET AVAILABLE OBJECT SPACE

Purpose

This command returns how much object space is available for further consumption in usits. The available object space will be put into the command size mailboxes. Using the mailbox registers will eliminate the need to perform a bus master interface transfer for a single word of data. For example, to create one object without any attributes you need 4 units, to create one counter, state or threshold attribute, you need 1 unit, to create one string or data attribute, you need 2 to 5 units and to create one queue attribute, you need 5 units.

| Command Format |
|---|
| Command (13h) (byte) |

GET OBJECT

Purpose

The "Get Object" command returns the object block header for the object specified. The returned object header is identical to the object block header format used to create or modify the object. The size of the returned buffer is stored in the mailbox register set aside for the buffer size in bytes. The attributes offset in the object block header will contain a 0 offset.

| Command Format |
|---|
| Command (14h) (byte) |
| Object ID (4 bytes) |
| Instance (byte) |
| Host Buffer Address (4 bytes) |
| Buffer Size (2 bytes) |

6. GET NUMBER OF OBJECTS

Purpose

This Command returns the number of objects and all instances of objects currently stored on the system manager. The number returned is stored in the mailbox area set aside for buffer size.

| Command Format |
|---|
| Command (15h) (byte) |

7. GET ALL OBJECTS

Purpose

This command returns all of the information in the object block header for all the objects stored by the system manager. The size of the returned buffer is stored in the mailbox register set aside for the buffer size.

| Command Format |
|---|
| Command (16h) (byte) |
| Host Buffer Addr (4 bytes) |
| Buffer Size (2 bytes) |
| Result Format |
| The buffer that is returned is formatted as follows: |
| Object ID (4 bytes) |
| Instance (byte) |
| Class (4 bytes) |
| # Object log entries (byte) |
| Label (Null term. string (16 byte) |

8. GET OBJECTS BY CLASS

Purpose

This command returns the objects stored on the system manager with the specified class. The return buffer size is stored in the mailbox register used for the host buffer size. A return buffer size of zero means no objects with the specified class exist.

| Command Format |
|---|
| Command (17h) (byte) |
| Class (4 bytes) |
| Host Buffer Address (4 bytes) |
| Buffer Size (2 bytes) |
| Result Format |
| The buffer that is returned is formatted as follows: |
| Object ID (4 bytes) |
| Instance (byte) |
| Class (4 bytes) |
| # Object log entries (byte) |

| |
|---|
| Label (Null term. string (16 byte)) |

9. GET CLASSES

Purpose

This command returns an array of all the different classes of objects stored on the system manager. The size of the returned array is stored in the mailbox register set aside for the host buffer size in bytes.

| Command Format |
|---|
| Command (18h) (byte) |
| Host Buffer Addr. (4 bytes) |
| Buffer Size (2 bytes) |
| Result Format |
| Class (4 bytes) |
| . |
| . |
| Class N (4 bytes) |

10. GET OBJECT LOG

Purpose

The latest information logged about an object's attribute(s) is returned. This information is the logged information saved in the object's circular log queue. Each log entry holds 12 bytes of information, so the buffer size needs to be large enough to hold the number of log queue entries requested. The maximum number of entries in the queue is 16. The log queue's length is specified in the object block header during object creation.

An entry in the log queue is made when one of the following commands operates on an object: modify attribute, increment, decrement, update or reset Log entries are made only for short attributes, not long.

| Command Format |
|---|
| Command (19h) (byte) |
| Object ID (4 bytes) |
| Instance (byte) |
| Host Buffer Address (4 bytes) |
| Buffer Size (2 bytes) |
| # of log entries to get (byte) |
| Result Format |
| The buffer that is returned is in the order of most recent entry to least recent entry and is formatted as follows: |
| Date (3 bytes) |
| Time (3 bytes) |
| Command (byte) |
| Attr. ID (byte) |
| Current Value (4 bytes) |

The size of the returned buffer is stored in the mailbox register set aside for the buffer size in bytes. A return buffer size of zero means no log entries exist for the specified object.

11. CREATE OBJECT ATTRIBUTES

Purpose

The purpose of this command is to add attribute settings to an object that was previously created.

| Command Format |
|---|
| Command (20h) (byte) |
| Object ID (4 bytes) |
| Instance (byte) |
| Attributes Block Header(s) |

12. MODIFY OBJECT ATTRIBUTES

Purpose

An object's attribute block header settings can be changed with this command. The attribute type bit fields and internal bit fields cannot be changed by this command. This command causes a log entry to be created.

| Command Format |
|---|
| Command (21h) (byte) |
| Object ID (4 bytes) |
| Instance (byte) |
| Attribute Block Header(s) |

13. DELETE OBJECT ATTRIBUTES

Purpose

This command is used to delete an object's attributes. Only the object attributes are deleted. The object and object log are not affected.

| Command Format |
|---|
| Command (22h) (byte) |
| Object ID (4 bytes) |
| Instance (byte) |
| Attribute Count (byte) |
| Attribute ID(s) |

14. GET OBJECT ATTRIBUTES

Purpose

The attribute blocks associated with the object are returned. The block is expanded from the creation block to include current value, date, and time associated with the current value. If the attribute count equals the hexadecimal value FFh, the attribute IDs will be ignored and all attributes for the object will be returned.

| Command Format |
|---|
| Command (23h) (byte) |
| Object ID (4 bytes) |
| Instance (byte) |
| Host Buffer Address (4 bytes) |
| Buffer Size (2 bytes) |
| Attribute Count (byte) |
| Attribute ID(s) |

Result Format

The attribute block(s) contain the following information when returned for counter, state, and threshold data types. In the case of a threshold attribute types the high and low limit values are returned.

| |
|---|
| Attribute ID (byte) |

-continued

```
Attribute type (2 bytes)
Voice Message # (byte)
Attribute label (16 byte)
Next Attribute offset (2 bytes)
Limit value (4 bytes)
Optional value (4 bytes)
Default value (4 bytes)
Current value (4 bytes)
Date (3 bytes)
Time (3 bytes)
```

For string, data, and queue types, for string or data is returned in place of the limit, optional, default, and current values.

```
Attribute ID (byte)
Attribute type (2 bytes)
Voice Message # (byte)
Attribute label (16 byte)
Next Attribute offset (2 bytes)
256 Byte String, Data, or Queue
Date (3 bytes)
Time (3 bytes)
```

The size of the returned buffer is stored in the mailbox register set aside for the buffer size in bytes.

15. RESET OBJECT ATTRIBUTE(S)

Purpose

This command resets object attributes to their default initial state. The attribute's default value is copied to the attribute's current value, and the time and date associated with the current value is updated. The date and time values come from the on board clock. No default values are kept for string, data, and queue types. This command causes a log entry to be generated for counter, state, and threshold attributes.

```
Command Format
Command (24h) (byte)
Object ID (4 bytes)
Instance (byte)
Attribute count (byte)
Attribute ID(s)
```

16. GET OBJECT'S ATTRIBUTE IDs

Purpose

All attribute identifiers for the object are returned in a byte list. The size of the byte list is returned in the mailbox register set aside for host buffer size in bytes.

```
Command Format
Command (25h) (byte)
Object ID (4 bytes)
Instance (byte)
Host Buffer Addr. (4 bytes)
Host Buffer Size (2 bytes)
Result Format
Attribute ID (byte)
    .
    .
    .
Attribute ID N (byte)
```

17. INCREMENT ATTRIBUTE(S)

Purpose

This command increments an object's attribute(s). If this causes an alert condition, the appropriate alert, as described in the attribute block, will be sent out. This command is one of three that may cause an alert on counter, state, and threshold type (short) attributes. It will not work on internal attributes. This command also causes an object log entry to be created.

```
Command Format
Command (30h) (byte)
Object ID (4 bytes)
Instance (byte)
Date (3 bytes)
Time (3 bytes)
Attribute Count (byte)
Attribute ID(s)
```

18. DECREMENT ATTRIBUTE(S)

Purpose

This command will decrement an object's attribute(s). Specifically, just like the increment attribute command, this command is one of three that may cause an alert condition on counter, state, and threshold type. It does not work on internal attributes.

This command causes an object log entry to be created.

```
Command Format
Command (31h) (byte)
Object ID (4 bytes)
Instance (byte)
Date (3 bytes)
Time (3 bytes)
Attribute Count (byte)
Attribute ID(s)
```

19. UPDATE ATTRIBUTE(S)

Purpose

This command causes an object's attribute(s) current value to be set to the specified value. Attribute count represents the number of attribute IDs, attribute type, current value/data arrays follow the attribute count. For data, string, and queue types the current value is replaced by a 256 byte data buffer. An update can be used to clear a string, data, or queue data type.

This command also causes an object log entry to be created for counter, state, and threshold data types. If current values are out of range when an update occurs an alert will occur.

```
Command Format
For counter, state, and threshold attribute types the
command is format as follows:
Command (32h) (byte)
Object ID (4 bytes)
Instance (byte)
Date (3 bytes)
Time (3 bytes)
Attribute Count (byte)
Attribute ID(s)
Attribute type (2 bytes)
```

-continued

| Command Format |
|---|
| For counter, state, and threshold attribute types the command is format as follows: |
| Current value (4 bytes) |

For string, data, and queue attribute types the command is format as follows:

| Command Format |
|---|
| Command (32h) (byte) |
| Object ID (4 bytes) |
| Instance (byte) |
| Date (3 bytes) |
| Time (3 bytes) |
| Attribute Count (byte) |
| Attribute ID(s) |
| Attribute type (2 bytes) |
| 256 byte buffer |

20. QUEUE ADD

Purpose

This command is used to add data to the circular queue. The number of bytes to add to the queue is specified by the data byte count field. A maximum of 255 bytes can be added to the queue at one time. The data bytes stored in the data field are copied into the queue and the queue offset is updated to point to the tope of the queue.

| Command Format |
|---|
| Command (33h) (byte) |
| Object ID (4 bytes) |
| Instance (byte) |
| Date (3 bytes) |
| Time (3 bytes) |
| Attribute Count (byte) |
| Attribute ID(s) |
| Data byte count (byte) |
| Data bytes (byte) |

21. GET ATTRIBUTE(S) SIZE

Purpose

This command will return the amount of buffer space in bytes used by the attributes specified in the attribute ID array. The buffer size will be put into the command size mailboxes. Using the mailbox registers will eliminate having to do a bus master interface transfer just for one word of data.

| Command Format |
|---|
| Command (34h) (byte) |
| Object ID (4 bytes) |
| Instance (byte) |
| Attribute Count (byte) |
| Attribute ID(s) |

Result Format

The buffer size will be put into the command size mailboxes.

In addition to object command, there is further provide certain additional or "special" commands which communicate with the system manager to allow for extra functionality between the host and the system manager. Included as special commands is the following:

1. SEND ATTRIBUTE UPDATE

Purpose

Send Attribute Update is initiated by the system manager to announce to the host system that changes have been made to the object space. The information sent includes the attribute IDs that were changed.

| Command Format | |
|---|---|
| Command (35h) (byte) | |
| Notify Flags (byte) | |
| Action (byte) | |
| Object ID (4 bytes) | |
| Instance (byte) | |
| Attribute Count (byte) | |
| Attribute ID(s) | |
| Notify Flags: | |
| Bit 0 | 1 - Overrun occurred with this change. |
| | 0 - No overrun occurred. |
| Bits 1-7 | Reserved |

Bit 0: If overrun is indicated, the notification of the change to the object space has not reached the host. Get the entire object space again. Overrun is set when the system manager detects that the system facility sends an update faster than the host can accept it or when an error code is returned from the host. The bit is reset to zero after the next notification of update is successfully delivered to the host. For example: If there are four updates, and the first is delivered successfully, but the second is missed, the overrun bit will be set. The third update will show the bit set because the notification was not successfully delivered to the host. The fourth update will show the bit reset to zero indicating that the third notification was successful. The overrun bit shows that data was lost somewhere between the first and fourth update.

Action

Object command causing the change. In such situation, either modify or reset is indicated.

2. ALERT

Purpose

This command causes an alert to be issued. If the command is sent from the host to the system board, the alert will be an out-of-band alert. If the command is sent from the system board to the host, it is an in-band alert. The alert message format is described below. If the message is not object related, for instance an out-of-band alert from the host, the two 16 byte fields for object and attribute label can be used for any alert message.

| Command Format |
|---|
| Command (40h) (byte) |
| Object ID (4 bytes) |
| Instance (byte) |
| Attribute ID (byte) |
| Attribute type (2 bytes) |
| Voice Error message # (byte) |
| Object label (16 bytes) |
| Attribute label (16 bytes) |
| Class (4 bytes) |
| Date (3 bytes) |
| Time (3 bytes) |

-continued

| Command Format |
| --- |
| Current Value (4 bytes) |
| Limit Value (4 bytes) |
| Optional Value (4 bytes) |

3. GET ALERT LOG

Purpose

The get alert log provides a history of alert events. This information is the raw logged information that is saved in the system alert log queue. Each entry contains 80 bytes as defined below. If the buffer size provided by the user is not large enough, the following information will be returned: as many entries as will fit in the buffer, the buffer size used and an error message (13b).

The maximum length of this log is 32 entries. If the number of log entries requested is larger than 32, then only 32 entries will be sent. An error message will be returned telling the user that too many entries were requested. After issuing the get alert log from the system manager facility, alert delivery status logged as done will not be retried.

Command Format:
Command (41h) (byte)
# of entries to get (byte)
Host Buffer Addr. (4 bytes)
Buffer Size (2 bytes)
Number of entries to get field retrieves alerts from the log in most recent entry order.
Results Format:
Object ID (4 bytes)
Instance (byte)
Attribute ID (byte)
Attribute type (2 bytes)
Voice Error message # (byte)
Object label (16 bytes)
Attribute label (16 bytes)
Class (4 bytes)
Date (3 bytes)
Time (3 bytes)
Current Value (4 bytes)
Limit Value (4 bytes)
Optional Value (4 bytes)
Alert Delivery Status (byte)
External Alert Status (16 byte)
Alert Delivery Status byte:
(Bit 7 = In 3)
in 3   in 2   in 1   in 0   out 3   out 2   out 1   out 0
In 3 - In 0 - in-band alert status
Out 3 - Out 0 - out-of-band alert status The log values for Alert Delivery Status Values

| Value | in 3 - in 0 | Out 3 - Out 0 |
| --- | --- | --- |
| 0 | Reserved | Reserved |
| 1 | Reserved | Reserved |
| 2 | Not done. (pending) | Not done. (pending) |
| 3 | Not done. (processing) | Not done. (processing) |
| 4 | alert failed | Not done. |
| 5 | alert success | Done (retry count = 0) |
| 6 | reserved | reserved |
| 7 | reserved | Not done. (retry is processing) |
| 8 | reserved | reserved |
| 9 | reserved | reserved |
| A | Invalid | Invalid |
| B-F | Reserved | Reserved |

After issuing the Get Alert Log, the Alert Status for some of the alerts will change to reflect the fact that those alerts marked as failed will have been taken care of. The new status marking is indicated below if a change occurs.

Alert Delivery Status value definitions:

0—This alert log entry has not been or is not being used.

1—This alert log entry has not been or is not being used.

2—This alert log entry is valid, but has not been sent yet. Content is correct; alert has been queued but not sent. After viewing the Alert log, in and out-of-band will be marked Not Done.

3—This alert log entry has been sent out, but has not been responded to yet. Content is correct, but no acknowledgement has been received. After viewing the Alert log, in and out-of-band will be marked Not Done.

4—The in-band alert has failed to complete; the out-of-band has not been sent to all requested alert destination numbers. After viewing the Alert Log, in-band will be marked Success and out-of-band will be marked Done.

5—This alert entry has been successfully delivered in-band or has tried all the assigned out-of-band alert destinations (the External Alert status bit 0-2 is not in the "to be delivered" state). Some of the out-of-band destinations may not have been reached, but the retry count=0.

7—The retry task is processing this alert. (Applies to out-of-band only.) After viewing the Alert log, out-of-band will be marked Done.

A—The alert log entry has been made invalid because of a connect list modification after partial processing of the alert.

External Alert Status

There is one byte for each connect member. Bit 3–7 is the number of retries left to be tried.

| Bits 7-3 No. of retries left | | Status2 | Status 1 | Status0 |
| --- | --- | --- | --- | --- |
| Status2 | Status1 | Status0 | Meaning | |
| 0 | 0 | 0 | Not assigned | |
| 0 | 0 | 1 | Successfully delivered. | |
| 0 | 1 | 0 | Failed to deliver. Retry count has been met, no more tries will be made. | |
| 0 | 1 | 1 | Will not be delivered in current time frame. | |
| 1 | 0 | 0 | Falls in current time frame; will be delivered. | |
| 1 | 0 | 1 | Reserved | |
| 1 | 1 | 0 | Reserved | |
| 1 | 1 | 1 | Reserved | |

Failed to deliver: The retry count set in the configuration has been met. No more tries will be made to deliver the alert.

Will not be delivered in current time frame: The current time frame is the time frame during which the user has requested that alerts be delivered. For example, if the time frame is defined as Mon-Fri. 8:00 to 5:00, alerts will be sent only during this time. All alerts that fall out of the time frame will be logged with this status.

Falls in current time frame; will be delivered: The alert is waiting to be delivered.

4. GET FEATURE SETTINGS

Purpose

This firmware date of creation and the board settings are returned. This command requires a 5 byte buffer for month, day, and year in BCD format.

Command Format
Command (42h) (byte)
Host Buffer Addr. (4 bytes)
Buffer Size (2 bytes)
Result Format
Month (byte)
Day (byte)
Year (byte)
Board Setting 1 (byte)
Board Setting 2 (byte)

| | Board Setting 1: |
|---|---|
| Bit | Set to: |
| Bit 0 | 1 - International Modem |
| | 0 - U.S. Modem |
| Bit 1 | 1 - Modem installed |
| | 0 - No modem installed |
| Bit 2 | 1 - Voice ROM installed |
| | 0 - No voice ROM |
| Bit 3 | 1 - Async disabled |
| | 0 - Async disabled |
| Bit 4 | 1 - Alerting disabled |
| | 0 - Alerting enabled |
| Bit 5 | 1 - Innate monitoring disabled |
| | 0 - Innate monitoring enabled |
| Bit 6 | 1 - Battery disconnected |
| | 0 - Battery connected; memory contents retained across power recycling |
| Bit 7 | 1 - Board's dormant mode enabled on next host power down |

5. FEATURE CONTROL

Purpose

This command tells the system manager which features to enable or disable. Normally, this command is used to disable alerting when the host is going to cycle power. Each of the referenced features can be independently controlled as indicated.

Command Format
Command (49h) (byte)
Feature Flag 1 (byte)
Feature Flag 2 (byte)

| | Feature Flag 1: |
|---|---|
| Bit 0 | 1 - Disconnect battery |
| | 0 - Reconnect battery |
| Bit 1 | 1 - Disable asynchronous interface |
| | 0 - Reenable asynchronous interface |
| Bit 2 | 1 - Disable alert processing for new alert logging; no new alerts are added to alert log. All in- and out-of-band alerts in alert log will be marked Invalid. |
| | 0 - Reenable alert processing |
| Bit 3 | 1 - Disable innate object monitoring |
| | 0 - Reenable innate object monitoring |
| Bit 4 | 1 - Enable Board's dormant mode on next host power down |
| Bit 5-7 | Reserved |

Where:
Bit 0: Resets to zero automatically when the first configuration is loaded.

Bit 1, 2, 3: will retain their values across multiple power cycles if the battery is connected.

Bit 4: When this bit is enabled and the host loses power, the Board begins operating on battery power. Once the Board enters battery mode (Reserve), instead of transitioning to Standby, the Board goes directly to Dormant Mode. While in this mode, the Board can only be re-activated with host power returning.

| | Feature Flag 2: |
|---|---|
| Bit 0 | 1 - Remote console audible indicator disabled. |
| | 0 - Remote console audible indicator enabled. |

6. REGISTER DRIVER

Purpose

This command tells the system manager how much support the host driver is capable of providing, and in the case of the host watch dog, how often the host should send the host watch dog command. If there is no support for the host watch dog, then the time should be left as zero. The watch dog time is a byte value representing the number of minutes (up to 60 minutes) until the host should send a watch dog command. The support level is defined by the following bit encoded field.

Command Format
Command (54h) (byte)
Support level (2 bytes)
Run-time Watch Dog (byte)
Run-time Watch Dog - the maximum amount of time between successive watch dog commands before an alert will be issued.

| | Support Level: |
|---|---|
| bit 0 | 1 - there is no support and the state of the other bits is ignored. |
| | 0 - use the other bits to select desired support level. |
| bit 1 | 1 - in-band alert support. |
| | 0 - no in-band alert support. |
| bit 2 | 1 - Send Attribute Update support available. |
| | 0 - Send Attribute Update support not available. |
| bit 3 | Reserved. |
| bit 4 | 1 - Host Watch Dog support available. |
| | 0 - No Host Watch Dog support. |
| bit 5 | Reserved. |
| bit 6 | Reserved. |
| bit 7 | Reserved. |
| bits 8-15 | Reserved. |

7. SELF-TEST ERROR CODE

Purpose

System POST can use this command to determine the state of the system manager. The actual test failure status is indicated in the mailbox area set aside for buffer size.

Command Format
Command (4bh) (byte)

| | Result Format |
|---|---|
| Bit 0 | 1 - ROM Checksum failed. |
| Bit 1 | 1 - RAM test failed. |
| Bit 2 | 1 - 80186 timer failed. |
| Bit 3 | 1 - Built-in modem failed. |
| Bit 4 | 1 - Direct connect interface failed. |
| Bit 5 | 1 - Real-time clock failed. |
| Bit 6 | 1 - Temperature and voltage sensor failed. |
| Bit 7 | 1 - DTMF failed. |
| Bit 8 | 1 - VSL failed. |
| Bit 9 | 1 - Host bus monitor failed. |
| Bit 10 | Bus master interface failed |
| Bit 11 | Battery is broken |
| Bit 12-15 | Reserved |

8. HOST WATCH DOG

Purpose

The host watch dog command is used to notify the system manager that the host system is still operating correctly. If watch dog support is specified in the register driver command and the host fails to send a host watch dog command before the time specified in the register driver command, an alert will be sent out-of-band only. When the system manager's host watch dog times out, the host application needs to issue another register driver command to restore the features controlled by the register driver.

| Command Format |
| --- |
| Command (53h) (byte) |

Appendix A—Errors

The following chart shows error codes and their meaning.

| Error Codes | |
| --- | --- |
| Code | Meaning |
| 0h | Command completed ok. |
| 1h | Invalid command - The command byte given is not defined. |
| 2h | Abort - The command was aborted; cannot communicate with host. |
| 3h | Reserved. |
| 4h | Reserved. |
| 5h | Invalid command format - The command is improperly formed. |
| 6h | Reserved. |
| 7h | Reserved. |

| Error Codes | |
| --- | --- |
| Code | Meaning |
| 8h | Reserved. |
| 9h | Board requires configuration. |
| 0Ah | Reserved. |
| 0Bh | Reserved. |
| 10h | Object already exits. |
| 11h | Not enough memory to create object. |
| 12h | Object does not exist. |
| 13h | Host buffer size is not large enough. |
| 14h | Attribute does not exist. |
| 15h | Alert failed. |
| 16h | Reserved. |
| 17h | Instance of object does not exist. |
| 18h | Request for more log entries than exist in queue. Command will still complete. |
| 19h | Reserved. |
| 1Ah | Board not available. |
| 20h | Log entry out of range. |
| 21h | Attribute string too long. |
| 22h | Invalid type field. |
| 23h | Invalid internal attribute operation. |
| 24h | Attribute already exits. |
| 25h | Invalid attribute offset. |
| 26h | Current value out of range. |
| 27h | Invalid limits |
| 28h | Invalid attribute ID |
| FFh | Self test error occurred. |

Appendix B—Error Codes by Command

The following chart is a lift of commands by their command codes 10h–23h. If a particular error can occur for that command "x" appears.

| Error Code | Command Codes | | | | | | | | | | | | | |
| --- | --- | --- | --- | --- | --- | --- | --- | --- | --- | --- | --- | --- | --- | --- |
| | 10h | 11h | 12h | 13h | 14h | 15h | 16h | 17h | 18h | 19h | 20h | 21h | 22h | 23h |
| 0h | x | x | x | x | x | x | x | x | x | x | x | x | x | x |
| 1h | x | x | x | x | x | x | x | x | x | x | x | x | x | x |
| 2h | x | x | x | x | x | x | x | x | x | x | x | x | x | x |
| 5h | x | x | x | x | x | x | x | x | x | x | x | x | x | x |
| 9h | x | x | x | x | x | x | x | x | x | x | x | x | x | x |
| 10h | x | | | | | | | | | | | | | |
| 11h | x | | | | | | | | | | | x | | |
| 12h | | x | x | | x | | | | | | x | x | x | x |
| 13h | | | | | x | | x | x | x | x | | | | x |
| 14h | | | | | | | | | | | | x | x | x |
| 15h | | | | | | | | | | | | | | |
| 17h | | x | x | | x | | | | | | x | x | x | x |
| 18h | | | | | | | | | | | x | | | |
| 1Ah | x | x | x | x | x | x | x | x | x | x | x | x | x | |
| 20h | x | x | | | | | | | | | | | | |
| 21h | x | | | | | | | | | | | | | |
| 22h | x | | | | | | | | | | | | | |
| 23h | x | | x | | | | | | | | | | | |
| 24h | x | | | | | | | | | | | | | |
| 25h | x | | | | | | | | | | | | | |
| 26h | | | | | | | | | | | | | | |
| 27h | x | | | | | | | | | | | | | |
| 28h | x | | | | | | | | | | | | | |
| FFH | Self-test error | | | | | | | | | | | | | |

Error Codes by Command

The following chart is a lift of commands by their command codes 24h–54h. If particular error can occur for that command "x" appears.

| Error Code | Command Codes | | | | | | | | | | | | |
| --- | --- | --- | --- | --- | --- | --- | --- | --- | --- | --- | --- | --- | --- |
| | 24h | 25h | 30h | 31h | 32h | 33h | 34h | 35h | 40h | 41h | 42h | 49h | 54h |
| 0h | x | x | x | x | x | x | x | x | x | x | x | x | x |
| 1h | x | x | x | x | x | x | x | | x | x | x | x | x |
| 2h | x | x | x | x | x | x | x | x | x | x | x | x | x |
| 5h | x | x | x | x | x | x | x | | x | x | x | x | x |

-continued

| Error Code | Command Codes | | | | | | | | | | | | |
|---|---|---|---|---|---|---|---|---|---|---|---|---|---|
| | 24h | 25h | 30h | 31h | 32h | 33h | 34h | 35h | 40h | 41h | 42h | 49h | 54h |
| 9h | x | x | x | x | x | x | x | | x | x | | x | x |
| 10h | | | | | | | | | | | | | |
| 11h | | | | | | | | | | | | | |
| 12h | x | x | x | | x | | | | | x | x | x | x |
| 13h | | x | | | | | | | | x | x | | |
| 14h | x | | x | x | x | x | x | | | | | x | x |
| 15h | | | | | | | | | | | | | |
| 17h | x | x | x | x | x | x | x | | | | | | |
| 18h | | | | | | | | | | | x | | |
| 1Ah | x | x | x | x | x | x | x | | x | x | x | x | x |
| 20h | | | | | | | | | | | | | |
| 21h | | | | | x | | | | | | | | |
| 22h | x | | x | x | x | x | | | | | | | |
| 23h | | x | x | x | x | | | | | | | | |
| 24h | | | | | | | | | | | | | |
| 25h | | | | | | | | | | | | | |
| 26h | | | | | | | | | | | | | |
| 27h | | | | | | | | | | | | | |
| 28h | | | | | | | | | | | | | |
| FFH | Self-test error | | | | | | | | | | | | |

Thus, there has been described and illustrated herein, a protocol for local data transfers between a manager for a computer system and a network operating system associated therewith. However, those skilled in the art will recognize that many modifications and variations besides those specifically mentioned may be made in the techniques described herein without departing substantially from the concept of the present invention. Accordingly, it should be clearly understood that the form of the invention as described herein is exemplary only and is not intended as a limitation on the scope of the invention.

What is claimed is:

1. A computer implemented method for transferring a command message from a network operating system to a system manager for a computer system associated therewith via an interface having at least one interface storage register for storing said command message during said transfer and a first interface control register for controlling said transfer of said command message, comprising the steps of:

said network operating system initiating a first use of said at least one interface storage register by setting a first bit of said first interface control register when said first bit of said first interface control register is not set;

the prior contents of said first bit of said first interface control register transferring to a second bit of said first interface control register each time said first bit of said interface control register is set or reset;

said network operating system testing said second bit of said first interface control register, said at least one interface storage register being busy if said second bit is set and not busy if said second bit is not set;

said network operating system writing said command message to said at least one interface storage register in response to said testing indicating said at least one interface storage register is not busy;

said second bit of said interface control register being set by an attempt to initiate a second use of said at least one interface storage register by setting said first bit of said interface control register while said first bit of said interface control register is set;

said network operating system informing said system manager that said command message has been written to said at least one interface storage register; and said system manager resetting said first bit of said first interface control register and reading said command message from said at least one interface storage register, said resetting of said first bit of said interface control register setting said second bit of said interface control register;

wherein a subsequent use of said at least one interface storage register is initiated by setting said first bit of said interface control register, said setting of said first bit of said interface control register resetting said second bit of said interface control register.

2. A method for transferring a command message according to claim 1 wherein the step of informing said system manager that said command message has been written to said at least one interface storage register further comprises the step of said network operating system setting a first bit of a second interface control register after writing said command message to said at least one interface storage register, said second interface control register transmitting an interrupt signal to said system manager in response to said setting of said first bit.

3. A method for transferring a command message according to claim 2 wherein the step of said system manager resetting said network operating system's reservation of said at least one interface storage register and reading said command message from said at least one interface storage register further comprises the steps of:

said system manager resetting said first bit of said second interface control register said scheduling a transfer of information to said at least one interface storage register in response to said command message read by said system manager; and upon completing the processing of said command message, said system manager transferring information to said at least one interface storage register and setting a first bit of a third interface control register.

4. A method for transferring a command message according to claim 3 and further comprising the steps of:

said network operating system reading said information stored in said at least one interface storage register, resetting said first bit of said third interface control register and resetting said first bit of said first interface control register.

5. A computer implemented method for transferring command information from a system manager for a computer system to a network operating system associated therewith via an interface having at least one interface storage register for storing said command information during said transfer and a first interface control register for controlling said transfer of said command information, comprising the steps of:

said system manager initiating a first use of said at least one interface storage register by setting a first bit of said first interface control register when said first bit of said first interface control register is not set;

the prior contents of said first bit of said first interface control register transferring to a second bit of said first interface control register each time said first bit of said interface control register is set or reset;

said system manager testing said second bit of said first interface control register, said at least one interface storage register being busy if said second bit is set and not busy if said second bit is not set;

said system manager writing said command information to said at least one interface storage register in response to said testing indicating said at least one interface storage register is not busy;

said second bit of said interface control register being set by an attempt to initiate a second use of said at least one interface storage register by setting said first bit of said interface control register while said first bit of said interface control register is set;

said system manager informing said network operating system that said command information has been written to said at least one interface storage register; and said network operating system resetting said first bit of said first interface control register and reading said command information from said at least one interface storage register, said resetting of said first bit of said interface control register setting said second bit of said interface control register;

wherein a subsequent use of said at least one interface storage register is initiated by setting said first bit of said interface control register, said setting of said first bit of said interface control register resetting said second bit of said interface control register.

6. A method for transferring command information according to claim 5, wherein the step of said system manager writing command information to said at least one interface storage regulator further comprises the steps of:

writing command size information to said at least one interface storage register; and writing command type information to said at least one interface storage register.

7. A method for transferring command information according to claim 6 wherein the step of informing said network operating system that said command information has been written to said at least one interface storage register further comprises the step of said system manager setting a first bit of a second interface control register after writing said command size information and said command type information to said at least one interface storage registers.

8. A method for transferring command information according to claim 7 wherein the step of said network operating system reading said command information from said at least one interface storage register further comprises the steps of:

said network operating system reading said command size information and said command type information from said at least one interface storage register;

said network operating system allocating buffer space based upon said command size information and said command type information;

said network operating system writing error information and address and size information for said allocated buffer space to said at least one interface storage register;

said network operating system setting a first bit of a third interface control register;

said system manager reading said error information and said address and size information for said allocated buffer space from said at least one interface storage register;

said system manager resetting said first bit of said third interface control register; and said system manager transferring a command to said allocated buffer of said network operating system.

9. A method for transferring a command message according to claim 8 and further comprising the step of said system manager setting said first bit of said second interface control register a second time to inform said network operating system that said command transfer has been completed.

10. A method for transferring a command message according to claim 9 and further comprising the steps of:

said network operating system processing said command transferred to said allocated buffer;

said network operating system transferring error information to said at least one interface storage register;

said network operating system again setting said first bit of said third interface control register;

said system manager reading said error information from said at least one interface storage register; and said system manager resetting said first bit of said third interface control register and said first bit of said first interface control register.

11. A computer implemented method for exchanging command information between a network operating system and a system manager for a computer system associated therewith via an interface having at least one mailbox register through which said command information is exchanged and a semaphore register and first and second doorbell registers for controlling said exchange of said command information, comprising the steps of:

said network operating system initiating a first use of said at least one interface mailbox register by setting a first bit of said semaphore register when said first bit of said semaphore register is not set;

the prior contents of said first bit of said semaphore register transferring to a second bit of said semaphore register each time said first bit of said semaphore register is set or reset;

said network operating system testing said second bit of said semaphore register, said at least one mailbox register being busy if said second bit is set and not busy if said second bit is not set;

said network operating system writing a command message to said at least one mailbox register in response to said testing indicating said at least one mailbox register is not busy;

said second bit of said interface control register being set by an attempt to initiate a second use of said at least one mailbox register by setting said first bit of said semaphore register while said first bit of said semaphore register is set;

said network operating system informing said system manager that said command message has been written to said at least one mailbox register by setting said first doorbell register;

said system manager resetting said first doorbell register, reading said command message from said at least one mailbox register and processing said command message read from said at least one mailbox register;

upon completing said processing of said command message, said system manager setting said second doorbell register and placing error information in said at least one mailbox register;

said network operating system reading said error information stored in said at least one mailbox register, resetting said second doorbell register and resetting said first bit of said semaphore register, said resetting of said first bit of said semaphore register setting said second bit of said semaphore register;

wherein a subsequent use of said at least one mailbox register is initiated by setting said first bit of said semaphore register, said setting of said first bit of said semaphore register resetting said second bit of said semaphore register.

12. A computer implemented method for exchanging command information between a network operating system and a system manager for a computer system associated therewith via an interface having at least one mailbox register for storing said command information during said transfer and a semaphore register and first and second doorbell registers for controlling said exchange of said command information, comprising the steps of:

said system manager initiating a first use of said at least one mailbox register by setting a first bit of said semaphore register when said first bit of said semaphore register is not set;

the prior contents of said first bit of said semaphore register transferring to a second bit of said semaphore register each time said first bit of said semaphore register is set or reset;

said system manager testing said second bit of said semaphore register, said at least one mailbox register being busy if said second bit is set and not busy if said second bit is not set;

said system manager writing a command size to said at least one mailbox register in response to said testing indicating said at least one mailbox register is not busy;

said system manager informing said network operating system that said command size has been written to said at least one mailbox register by setting said first doorbell register;

said network operating system resetting said first doorbell register, reading said command size from said at least one mailbox register, allocating a buffer sized in accordance with said received command size, writing a buffer address for said allocated buffer to said at least one mailbox register, and informing said system manager that said buffer address has been written to said at least one mailbox register by setting said second doorbell register;

said system manager reading said buffer address from said at least one mailbox register, resetting said second doorbell register, transferring a command to said allocated buffer and informing said network operating system that said command transfer is complete by setting said first doorbell register;

upon completing said processing of said command, said network operating system placing error information in said at least one mailbox register and informing said system manager of said error information by setting said second doorbell register;

said second bit of said semaphore register being set by an attempt to initiate a second use of said at least one mailbox register by setting said first bit of said semaphore register while said first bit of said semaphore register is set;

said system manager reading said error information from said at least one mailbox register, resetting said second doorbell register and resetting said first bit of said semaphore register; and said resetting of said first bit of said semaphore register setting said second bit of said semaphore register;

wherein a subsequent use of said at least one mailbox register is initiated by setting said first bit of said semaphore register, said setting of said first bit of said semaphore register resetting said second bit of said semaphore register.

* * * * *